(12) United States Patent
Sunada et al.

(10) Patent No.: US 10,110,776 B2
(45) Date of Patent: Oct. 23, 2018

(54) IMAGE READING APPARATUS AND IMAGE READING METHOD

(71) Applicant: CANON KABUSHIKI KAISHA, Tokyo (JP)

(72) Inventors: Hidenori Sunada, Abiko (JP); Asahiro Nakayoshi, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/672,079

(22) Filed: Aug. 8, 2017

(65) Prior Publication Data

US 2018/0048786 A1    Feb. 15, 2018

(30) Foreign Application Priority Data

Aug. 12, 2016   (JP) .................................. 2016-158738

(51) Int. Cl.
*G06K 15/00*    (2006.01)
*H04N 1/387*    (2006.01)
*H04N 1/00*    (2006.01)

(52) U.S. Cl.
CPC ....... *H04N 1/3878* (2013.01); *H04N 1/00588* (2013.01); *H04N 2201/0081* (2013.01)

(58) Field of Classification Search
CPC .............. H04N 1/00588; H04N 1/121; H04N 1/00625; H04N 1/00771; H04N 1/00777; H04N 1/00761; H04N 1/00477; H04N 1/00506; H04N 1/3263

USPC ......................................................... 358/1.18
See application file for complete search history.

(56) References Cited

U.S. PATENT DOCUMENTS

| | | | |
|---|---|---|---|
| 6,552,828 B1 * | 4/2003 | Gatto ................... | H04N 1/0071 358/471 |
| 7,561,313 B2 * | 7/2009 | Endo ................... | H04N 1/00567 271/225 |
| 9,016,688 B2 * | 4/2015 | Miyamoto ............... | B65H 9/20 271/227 |
| 2017/0041478 A1 | 2/2017 | Nakayoshi et al. ........ | H04N 1/00801 |

FOREIGN PATENT DOCUMENTS

JP        2012-244383        12/2012

* cited by examiner

*Primary Examiner* — Neil R McLean
(74) *Attorney, Agent, or Firm* — Fitzpatrick, Cella, Harper & Scinto

(57) ABSTRACT

An image reading apparatus reads an original image of an original placed on an original tray by a scanner unit. The original is conveyed to a reading position used by the scanner unit from the original tray through a conveyance path. A registration roller pair configured to mechanically correct skew of the original at a time of conveyance of the original is provided on the conveyance path. The image reading apparatus calculates a skew amount at the time of the conveyance of the original based on the original image, and conducts image processing on the original image based on the skew amount, to thereby correct a tilt of the original image. The image reading apparatus stops the conveyance of the original when the absolute value of the skew amount is larger than a first threshold value.

20 Claims, 22 Drawing Sheets

IMAGE READING APPARATUS AND IMAGE READING METHOD

BACKGROUND OF THE INVENTION

Field of the Invention

The present invention relates to an image reading apparatus configured to read an image of an original (original image) while conveying the original.

Description of the Related Art

Some image forming apparatus, for example, a copying machine and a facsimile machine, include an image reading apparatus for reading an original image. The image reading apparatus can continuously read respective images of a plurality of originals through use of an auto document feeder (ADF). When the ADF is used, the original is fed from an original tray, and conveyed to a reading position by a conveyance roller pair. The conveyance roller pair is formed so as to sandwich a conveyance path with a pair of conveyance rollers, and is configured to rotate while sandwiching an original, to thereby convey the original. Skew may occur in the original being conveyed by the conveyance roller pair due to variations in how the respective rollers that form the conveyance roller pair are parallel to a direction (main scanning direction) perpendicular to a conveyance direction of the original. Due to the skew of the original, the read original image become tilted. When the original image becomes tilted, there occurs such an image defect that the original image is partially missing in the read image or a larger portion of a background part (conveyance path) of the original is included.

There is an image reading apparatus configured to correct a tilt of the original image by image processing when such an image defect occurs. The image reading apparatus extracts a boundary between an original part and the background part of the read original image, to thereby detect an angle (skew amount) with respect to a conveyance direction of the original. The image reading apparatus corrects the tilt of the original image by the image processing based on the detected skew amount. Such correction of the tilt of the original image using the image processing has a limit to the amount that can be corrected. For example, such correction of the tilt of the original image cannot be conducted for the original being skew-fed too considerably to read the entirety of the original image corresponding to one sheet. Therefore, an image reading apparatus disclosed in Japanese Patent Application Laid-open No. 2012-244383 temporarily finishes reading processing by determining that the reading of the original image has failed when the tilt of the original image cannot be corrected by the image processing due to considerable skew. At a time of restarting a reading processing operation, the image reading apparatus mechanically conducts the skew correction for the original before the original reaches the reading position. When the skew amount of the original abruptly becomes larger, the configuration of the image reading apparatus disclosed in Japanese Patent Application Laid-open No. 2012-244383 is effective.

The mechanical skew correction for the original is conducted by bringing a leading edge of the original in the conveyance direction into abutment with the registration roller pair provided on the conveyance path. In the mechanical skew correction, collision noise is produced when the original is brought into abutment with the registration roller pair, or driving noise is produced when the registration roller pair is driven or stopped. Therefore, the image reading apparatus capable of the tilt correction for the original image using the image processing and the mechanical skew correction prioritizes the tilt correction for the original image using the image processing in order to reduce noise.

There is a case where the original is liable to be skew-fed with a fixed angle depending on a state where the original is placed on the original tray or a relationship between widths (lengths in a direction perpendicular to the conveyance direction) of the conveyance roller pair and the original. In such a case, the image reading apparatus disclosed in Japanese Patent Application Laid-open No. 2012-244383 forcedly finishes the reading processing when an original being skew-fed with a skew amount exceeding a limit of an amount of the tilt correction for the original image using the image processing appears before the image reading apparatus finishes reading a plurality of originals placed on the original tray. When the reading processing is forcedly finished, the plurality of originals fail to be read normally, which lowers usability. For example, when the plurality of originals placed on the original tray are liable to be skew-fed, the image reading apparatus corrects the tilt of the original image by the image processing, and temporarily finishes reading the original when the original image exceeding the limit of the amount of the correction is read. The image reading apparatus mechanically corrects the skew of the original after the original is set again. To that end, a user needs to perform twice an operation for setting the original on the original tray, resulting in poor operability. Therefore, the present invention has a main object to provide an image reading apparatus configured to efficiently correct a defect of an original image due to the skew of an original.

SUMMARY OF THE INVENTION

An image reading apparatus according to the present invention includes: an original tray on which an original is to be placed; a reader configured to read an image of the original; a conveyor configured to convey the original from the original tray to a reading position used by the reader; a skew corrector provided on a path for conveying the original and configured to mechanically correct skew of the original; an image processor configured to conduct image processing on an original image read by the reader, to thereby correct a tilt of the original image; an acquisition unit configured to acquire a skew amount with respect to a conveyance direction of the original at a time of conveyance of the original based on the original image read by the reader; and a controller configured to: stop the conveyance of the original using the conveyor in a case where an absolute value of the skew amount based on the original image read by the reader without conducting correction of the skew using the skew corrector is larger than a predetermined first threshold value; control the skew corrector to correct skew of a succeeding original and control the image processor to correct the tilt of the original image in a case where the absolute value of the skew amount is smaller than the predetermined first threshold value and larger than a second threshold value that is smaller than the predetermined first threshold value; and control the image processor to correct the tilt of the original image in a case where the absolute value of the skew amount is smaller than the second threshold value.

Further features of the present invention will become apparent from the following description of exemplary embodiments (with reference to the attached drawings).

DESCRIPTION OF THE EMBODIMENTS

Figure 1:
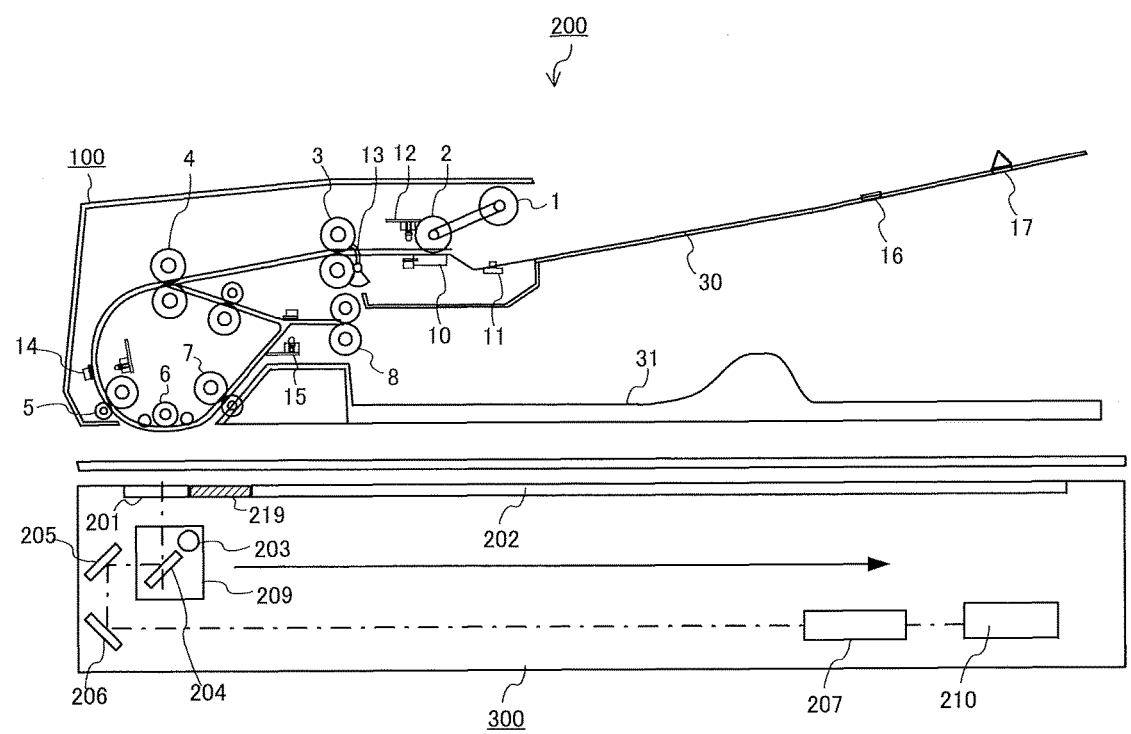
FIG. 1 is a configuration diagram of an image reading apparatus.

Now, embodiments of the present invention are described in detail with reference to the accompanying drawings below.
First Embodiment
Overall Configuration of Image Reading Apparatus FIG. 1 is a configuration diagram of an image reading apparatus according to a first embodiment of the present invention. An image reading apparatus 200 includes an ADF 100 and a reader 300.

The ADF 100 includes an original tray 30, a conveyance path, and a delivery tray 31. An original to be read is placed on the original tray 30. The original tray 30 includes two original size sensors 16 and 17. The original size sensor 16 is configured to detect a length (length in a direction perpendicular to a conveyance direction) of the original placed on the original tray 30 in its width direction. The original size sensor 17 is configured to detect a length (length in the conveyance direction) of the original placed on the original tray 30 in its longitudinal direction.

The conveyance path is a path for delivering originals placed on the original tray 30 to the delivery tray 31 through a reading position one by one. A sheet feeding roller 1, a separation roller 2, a registration roller pair 3, a conveyance roller pair 4, a lead roller pair 5 arranged upstream (hereinafter referred to as "upstream lead roller pair 5"), a platen roller 6, a lead roller pair 7 arranged downstream (hereinafter referred to as "downstream lead roller pair 7"), and a delivery roller pair 8 are provided on the conveyance path in order from an upstream side of the original in the conveyance direction. In addition, an original sensor 11, a separation sensor 12, a registration sensor 13, a read sensor 14, and a delivery sensor 15 are provided on the conveyance path in order from the upstream side of the original in the conveyance direction.

The sheet feeding roller 1 is supported at a position spaced apart from the original tray 30 when the original is not conveyed, and is configured to drop toward the original tray and rotate when the original is conveyed. With this configuration, the sheet feeding roller 1 feeds the original placed on the original tray 30 to the conveyance path. When a plurality of originals are placed on the original tray 30, the sheet feeding roller 1 feeds the originals in order from the uppermost original. It is detected by the original sensor 11 whether or not the original is present on the original tray 30. A separation pad 10 is provided at a position opposed to the separation roller 2 across the conveyance path. The originals fed by the sheet feeding roller 1 are separated one by one by the separation pad 10 and the separation roller 2 to be conveyed along the conveyance path. The separation roller 2 is configured to convey the original to the registration roller pair 3. The separation sensor 12 is configured to detect a trailing edge of the original fed by the sheet feeding roller 1.

The registration roller pair 3 is formed of a pair of rollers, and is configured to rotate while sandwiching the original, to thereby convey the original. The registration roller pair 3 is in a stopped state when the original is conveyed from the separation roller 2. A leading edge side of the original is brought into abutment with the registration roller pair 3 in a stopped state, and hence the leading edge side of the original is bent in a loop shape, and skew of a side of the original at the leading edge is canceled. Such a method of canceling the skew by changing a posture of the original with the registration roller pair 3 corresponds to "mechanical skew correction". The registration roller pair 3 conveys the original subjected to the skew correction to the upstream lead roller pair 5. The registration sensor 13 is provided on an upstream side of the registration roller pair 3 in the conveyance direction, and is configured to detect the leading edge of the original being conveyed. When the mechanical skew correction is skipped, the registration roller pair 3 conveys the original to the upstream lead roller pair 5 as it is without stopping the original being conveyed by the separation roller 2.

The upstream lead roller pair 5 is formed of a pair of rollers, and is configured to rotate while sandwiching the original, to thereby convey the original to the platen roller 6. The read sensor 14 is provided on an upstream side of the upstream lead roller pair 5 in the conveyance direction, and is configured to detect the leading edge of the original being conveyed. The platen roller 6 is arranged at the reading position of the original, and is configured to convey the original to the downstream lead roller pair 7 while suppressing fluttering of the original. The downstream lead roller pair 7 is formed of a pair of rollers, and is configured to rotate while sandwiching the original, to thereby convey the original to the delivery roller pair 8. The delivery roller pair 8 is formed of a pair of rollers, and is configured to rotate while sandwiching the original, to thereby deliver the original to the delivery tray 31. The delivery sensor 15 is provided on an upstream side of the delivery roller pair 8 in the conveyance direction, and is configured to detect the original being conveyed from the downstream lead roller pair 7 to the delivery sensor 15.

The reader 300 includes a reading glass 201, an original table glass 202, mirrors 205 and 206, a lens 207, an optical scanner unit 209, a charge coupled device (CCD) sensor unit 210, and a reference white plate 219. A reading element is not limited to a CCD, and may be a contact image sensor (CIS). The reading glass 201 is arranged at the reading position so as to be opposed to the platen roller 6 across the conveyance path. That is, the reading position of an original image is a position located on the conveyance path between the platen roller 6 and the reading glass 201. The original table glass 202 has an original placed thereon when the original image is read without use of the ADF 100. The original is placed on the original table glass 202 so that a surface to be read faces downward. The reference white plate 219 is provided between the reading glass 201 and the original table glass 202, and is read when reference data on a white level due to shading is created.

The scanner unit 209 includes a light source lamp 203 and a mirror 204. The light source lamp 203 is configured to irradiate the original being conveyed to the reading position with light across the reading glass 201. The emitted light is reflected by the original. The light reflected by the original is reflected by the mirrors 204, 205, and 206 and condensed onto a light-receiving surface of the CCD sensor unit 210 by the lens 207. The CCD sensor unit 210 is configured to generate an image signal representing the original image based on the received reflected light. The scanner unit 209 is configured to emit light with a depth direction of FIG. 1 being set as one line. Hence, the depth direction of FIG. 1 corresponds to a main scanning direction. The conveyance direction of the original is perpendicular to the main scanning direction, and corresponds to the same direction as a sub-scanning direction.

Control System

Figure 2:
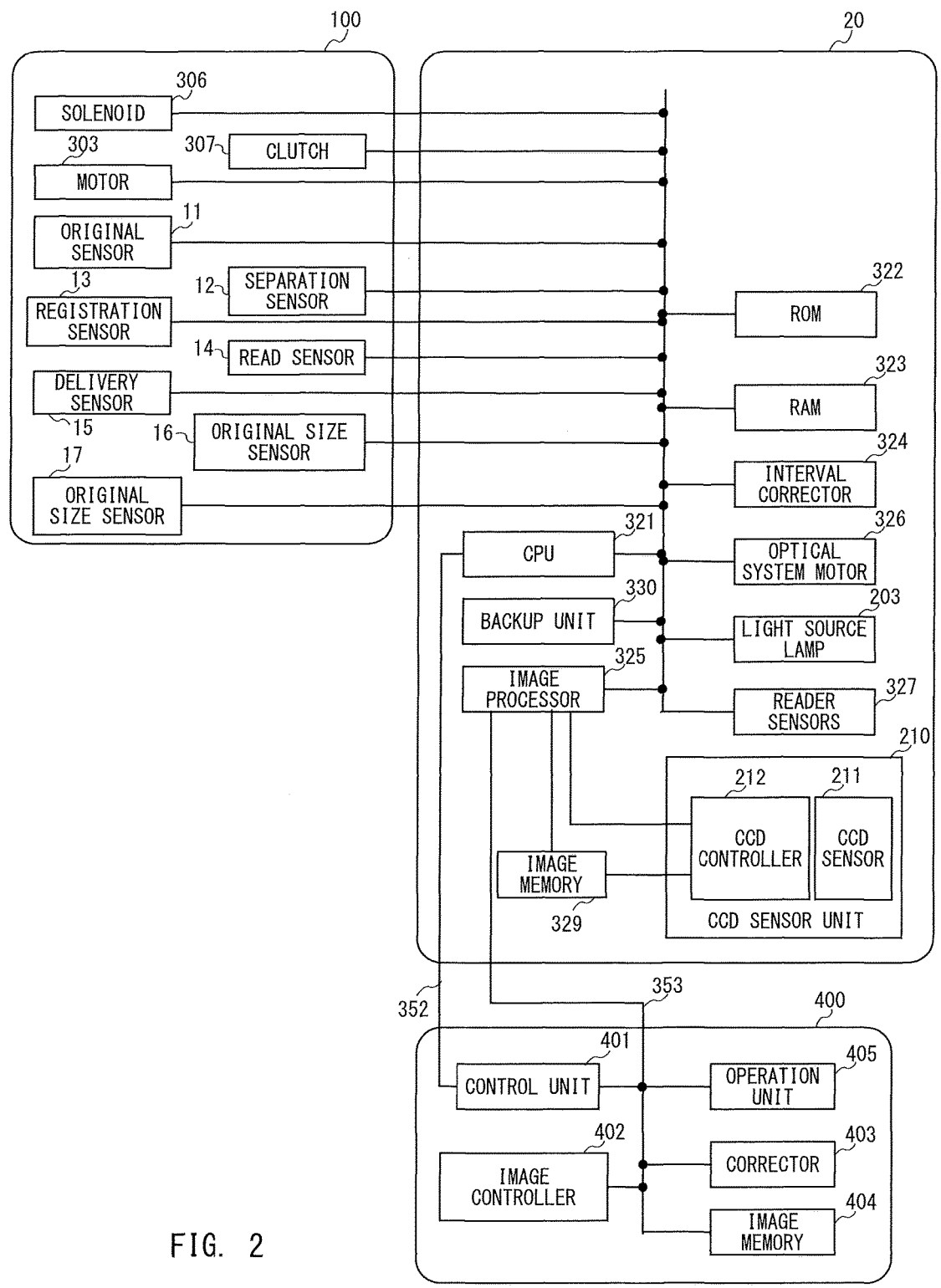
FIG. 2 is a configuration diagram of a control system.

FIG. 2 is a configuration diagram of a control system configured to control an operation of the image reading apparatus 200 having such a configuration. The control system includes a control block 20 configured to control operations of the ADF 100 and the reader 300 and a controller 400 configured to control the overall operation of the image reading apparatus 200. The control block 20 and the controller 400 are built into the image reading apparatus 200. The ADF 100 includes a motor 303, a solenoid 306, and a clutch 307 for driving each roller in addition to the above-mentioned components. Operations of the motor 303, the solenoid 306, and the clutch 307 are controlled by the control block 20.

The control block 20 is a computer system including a central processing unit (CPU) 321, a read only memory (ROM) 322, and a random access memory (RAM) 323. The CPU 321 is configured to control the operations of the ADF 100 and the reader 300 by reading a computer program stored in the ROM 322 and executing the computer program with the RAM 323 being used as a work area. The control block 20 includes an interval corrector 324, an optical system motor 326, an image processor 325, a backup unit 330, an image memory 329, and a reader sensors 327. The CPU 321, the ROM 322, the RAM 323, the interval corrector 324, the optical system motor 326, the image processor 325, the backup unit 330, the reader sensors 327, and the above-mentioned light source lamp 203 are communicably connected to one another through a bus. The image processor 325 is connected to the image memory 329 and the above-mentioned CCD sensor unit 210. The motor 303, the solenoid 306, the clutch 307, the original sensor 11, the separation sensor 12, the registration sensor 13, the read sensor 14, the delivery sensor 15, and the original size sensors 16 and 17 of the ADF 100 are also connected to the bus of the control block 20. The CPU 321 is configured to control the feeding and the conveyance of the original by controlling the operations of the motor 303, the solenoid 306, and the clutch 307 based on a detection result obtained by each of those sensors.

The backup unit 330 is configured to back up a part of data for work to be used for image reading processing, a setting value for each machine body of the image reading apparatus 200, and the like. The interval corrector 324 is configured to correct an interval between the originals being continuously conveyed. The optical system motor 326 is configured to drive an optical system driving motor. The CPU 321 is configured to control the optical system motor 326 and the light source lamp 203, and to control the CCD sensor unit 210 via the image processor 325, to thereby execute the image reading processing. The CCD sensor unit 210 includes a CCD sensor 211 and a CCD controller 212. The CCD sensor 211 is a light-receiving element configured to receive the light reflected by the original. The CCD controller 212 is controlled by the CPU 321, and is configured to convert the image signal corresponding to the reflected light received by the CCD sensor 211 into a digital signal, and to store the digital signal in the image memory 329. The reader sensors 327 is a platen opening/closing detecting sensor configured to detect opening or closing of the ADF 100 with respect to the reader 300, a platen size detecting sensor configured to detect the length of the original placed on the original table glass 202, or other such sensor.

The CPU 321 is configured to monitor detection results obtained by various sensors provided on the conveyance path in order for the ADF 100 to convey the original, and to drive the motor 303, the solenoid 306, and the clutch 307, which are loads, based on the detection results. The CPU 321 is configured to read the original image by conducting the conveyance control for the original using the ADF 100 and the image reading processing using the CCD sensor unit 210 in synchronization with each other.

The CCD sensor unit 210 is configured to generate the image signal being digital data representing the original image based on the received reflected light. The image processor 325 is configured to acquire the image signal from the CCD sensor unit 210, and to conduct various kinds of image processing, for example, shading processing, processing for detecting and correcting a streaked image or other such dust image on the image signal, and processing for detecting an amount of a tilt of the original and correcting the tilt. The image memory 329 is configured to provide a work area for the image processing. The image signal subjected to the image processing by the image processor 325 is successively transmitted to the controller 400 through a controller interface image communication line 353 including a clock signal line for image transmission. An image leading edge signal being a reference of the leading edge of the original image within the image signal is transmitted to the controller 400 through a controller interface control communication line 352 at a timing adjusted by the CPU 321.

The controller 400 includes a control unit 401, an image controller 402, a corrector 403, an image memory 404, and an operation unit 405. The control unit 401, the image controller 402, the corrector 403, the image memory 404, and the operation unit 405 are communicably connected to one another through the controller interface image communication line 353. The operation unit 405 is a user interface, and allows a user to input various instructions. The operation unit 405 also includes a display, and is capable of, for example, displaying information for the user. The image signal transmitted to the controller 400 via the image processor 325 is subjected to image control, for example, magnification or rotation, by the image controller 402, and is then transmitted to the corrector 403. The corrector 403 is configured to subject the image signal to correction processing for a color tint or the like, and to store the image signal in the image memory 404. The above-mentioned processing is conducted on the image signal representing the original image, to thereby generate image data representing the original image.

Reading Processing for Original on Original Table Glass 202

Figure 3:
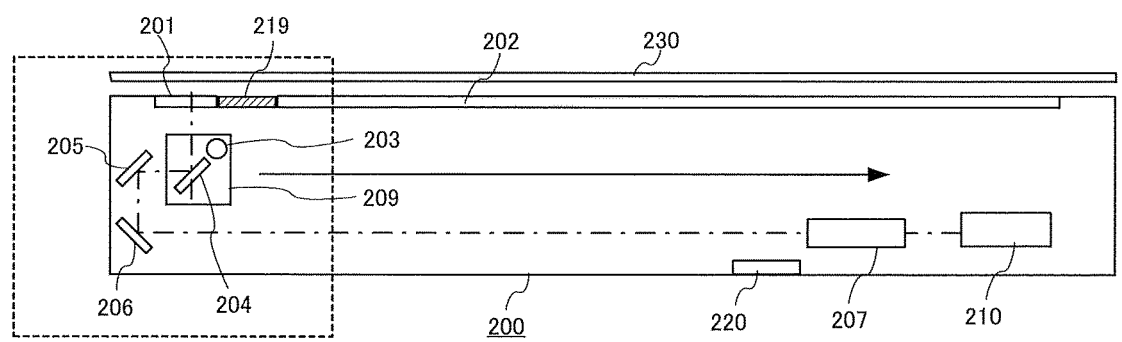
FIG. 3 is an explanatory diagram of reading processing for an original on an original table.

FIG. 3 is an explanatory diagram of processing for reading the original on the original table glass 202 without use of the ADF 100. The image reading apparatus 200 reads the original on the original table glass 202 while moving the scanner unit 209 in a direction indicated by the arrow of FIG. 3. The scanner unit 209 is moved by the optical system motor 326. The CCD sensor unit 210, which has received the light reflected by the original on the original table glass 202, outputs the image signal representing the original image.

The reference white plate 219 is used to create the reference data on the white level due to the shading. Immediately after the image reading processing is started, the scanner unit 209 is moved to a position immediately below the reference white plate 219. With this processing, the image reading apparatus 200 reads the reference white plate 219, and conducts the shading based on a result of the reading.

Reading Processing for Original Using ADF 100

FIG. 4A to FIG. 4I are explanatory diagrams of reading processing using the ADF 100. When the image reading processing using the ADF 100 is instructed by the operation unit 405, the scanner unit 209 is moved to the position immediately below the reference white plate 219. The image reading apparatus 200 executes the shading based on the result of reading the reference white plate 219. After the shading, the scanner unit 209 is moved to the position immediately below the reading glass 201, and stands by until the original is conveyed to the reading position.

Figure 4A:
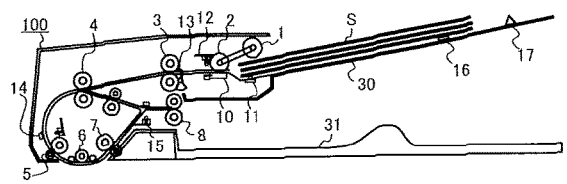
FIG. 4A, FIG. 4B, FIG. 4C, FIG. 4D, FIG. 4E, FIG. 4F, FIG. 4G, FIG. 4H, and FIG. 4I are explanatory diagrams of the reading processing using an ADF.

FIG. 4A is an illustration of a state immediately after the image reading processing is started. An original stack formed of a plurality of originals S is placed on the original tray 30. When the image reading processing is started, the sheet feeding roller 1 is caused to drop on the original stack and to start rotating. The uppermost original S of the original stack is fed by the sheet feeding roller 1. The originals S of the original stack are separated one by one to have the uppermost original S fed by the sheet feeding roller 1, the separation roller 2, and the separation pad 10.

Figure 4B:
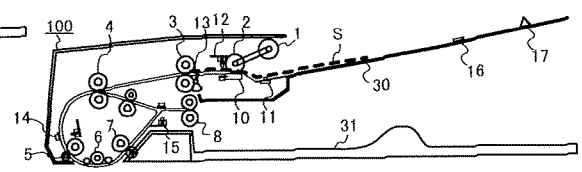

FIG. 4B is an illustration of the original S conveyed to the registration roller pair 3 by the separation roller 2. The sheet feeding roller 1, the separation roller 2, and the registration roller pair 3 are driven by the same motor. When the registration sensor 13 detects the leading edge of the original S being conveyed by the sheet feeding roller 1 and the separation roller 2, the motor 303 stops the rotation of the registration roller pair 3. When the registration roller pair 3 is stopped, the original S is stopped in abutment with the registration roller pair 3. The original S has a loop formed on the leading edge side by the registration roller pair 3 in a stopped state, and is subjected to the mechanical skew correction. The motor is stopped at a timing when a loop amount necessary for the skew correction is formed, and the clutch 307 configured to transmit driving forces to the sheet feeding roller 1 and the separation roller 2 is brought into a disconnected state. Instead of conducting the mechanical skew correction, it is also possible to continuously convey the original S without bringing the original S into abutment with the registration roller pair 3 by rotating the registration roller pair 3 as well while the sheet feeding roller 1 and the separation roller 2 are rotating. The original S is conveyed from the registration roller pair 3 to the conveyance roller pair 4.

When the image signal being the result of the reading is ready to be received, the controller 400 notifies the CPU 321 of an image reading request. The operation conducted by the CPU 321 when the image reading request is received is different depending on whether to form the loop by bringing the original S into abutment with the registration roller pair 3 (to conduct the mechanical skew correction) or to keep conveying the original S without bringing the original S into abutment to form the loop (to skip the mechanical skew correction).

When the mechanical skew correction is conducted, the CPU 321 restarts conveying the original S downstream of the registration roller pair 3 by receiving the image reading request. The CPU 321 controls the motor to rotate when the conveyance is restarted, and keeps the clutch 307 configured to transmit a driving force to the separation roller 2 in a disconnected state. This inhibits the separation roller 2 from rotating and allows only the registration roller pair 3 to rotate to convey the original S. The conveyance roller pair 4, the upstream lead roller pair 5, the platen roller 6, and the downstream lead roller pair 7 have driving forces transmitted from the same motor. The conveyance roller pair 4 also starts rotating at a timing when the leading edge of the original S reaches the conveyance roller pair 4 after the registration roller pair 3 restarts rotating.

When the mechanical skew correction is skipped, the registration roller pair 3 continues rotating even when the registration sensor 13 detects the leading edge of the original S. The CPU 321 conveys the original S to a downstream side of the registration roller pair 3 irrespective of whether or not the image reading request has been received. The CPU 321 controls the conveyance roller pair 4 to rotate at a timing when the leading edge of the original S reaches the conveyance roller pair 4.

Figure 4C:
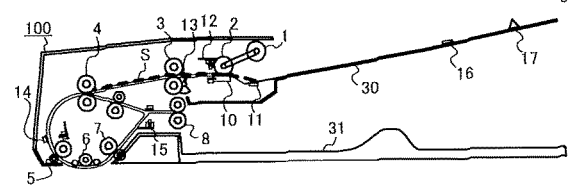
Figure 4D:
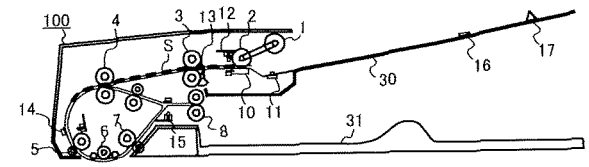

The conveyance roller pair 4 conveys the original S, which has been conveyed from the registration roller pair 3, to the upstream lead roller pair 5 as illustrated in FIG. 4C and FIG. 4D. The original S passes through the upstream lead roller pair 5 to be conveyed to the reading position in a vicinity of the platen roller 6. The read sensor 14 detects the leading edge of the original S being conveyed to the reading position. The CPU 321 measures a moving distance of the original that has moved since the read sensor 14 detected the leading edge of the original S by counting a clock of the motor configured to drive the upstream lead roller pair 5 and the platen roller 6. The CPU 321 thus measures a position of the original after the read sensor 14 detects the original, and determines a timing when the leading edge of the original is to reach the reading position based on the measurement result. The CPU 321 starts reading the original image by the CCD sensor unit 210 with the determined timing being used as a leading edge reference of the original image.

When receiving the image reading request before the image reading is started, the CPU 321 conducts the image processing on the image signal of the original image read by the CCD sensor unit 210 by the image processor 325, and then transmits the image signal to the controller 400. When the mechanical skew correction is conducted, the CPU 321 always receives the image reading request before the image reading is started in order for the registration roller pair 3 to restart conveying the original S after the image reading request is received.

When the mechanical skew correction is skipped, the CPU 321 continuously conveys the original S past the registration roller pair 3 irrespective of whether or not the image reading request is present, and starts reading the original image. Therefore, the CPU 321 may have received no image reading request when the reading is started depending on a processing situation of the controller 400. When the image reading request has not been received, the CPU 321 continues to store the image signal of the original image read by the CCD sensor unit 210 in the image memory 329 without transmitting the image signal to the controller 400. When receiving the image reading request from the controller 400, the CPU 321 transmits the image signal from the image memory 329 to the controller 400 via the image processor 325. At this time, the image signal is subjected to tilt correction using the image processing, which is described later in detail.

Figure 4E:
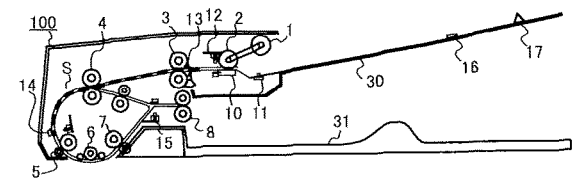

The length of the original S being conveyed is expressed by a time period during which the read sensor 14 keeps detecting the original S (time period taken after the leading edge is detected until the trailing edge is detected). FIG. 4E is an illustration of a state where the read sensor 14 keeps detecting the leading edge of the original S. After the read sensor 14 detects the original S, the detection result obtained by the registration sensor 13 is changed from a detected state of the original S to a non-detected state thereof. When the detection result obtained by the registration sensor 13 is changed to the non-detected state, the CPU 321 verifies whether or not an original to be read subsequently is present on the original tray 30 by the detection result obtained by the original sensor 11, and notifies the controller 400 of the result.

Figure 4F:
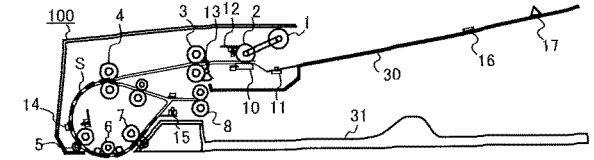
Figure 4G:
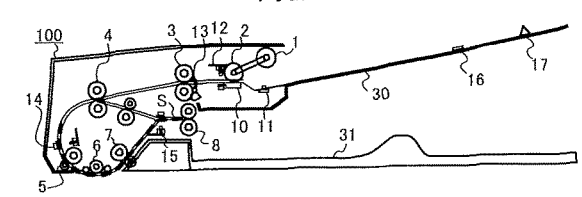
Figure 4H:
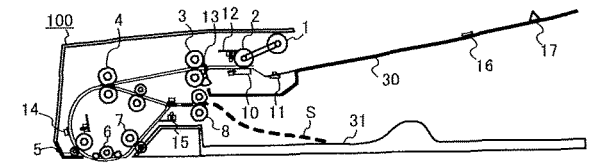
Figure 4I:
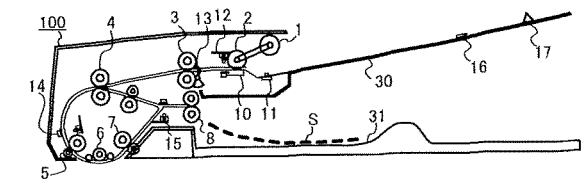

The original S passes through the conveyance roller pair 4 after passing through the registration roller pair 3 as illustrated in FIG. 4F. At this time, the leading edge of the original S has not reached a detection position of the delivery sensor 15. The CPU 321 drives the delivery roller pair 8 by having the delivery sensor 15 detect the original S when the leading edge of the original S reaches the detection position of the delivery sensor 15. After that, the trailing edge of the original S passes through a detection position of the read sensor 14 as illustrated in FIG. 4G. A timing to finish reading the original image is determined with a timing when the original S passes through the detection position of the read sensor 14 being used as a reference. The CPU 321 determines the timing to finish reading the original image with a timing when the read sensor 14 no longer detects the original S being used as a reference. The trailing edge of the original S passes through the upstream lead roller pair 5, the platen roller 6, and the downstream lead roller pair 7 in the stated order. The delivery sensor 15 detects the trailing edge of the original S as the last of the respective sensors as illustrated in FIG. 4H. When the detection result obtained by the delivery sensor 15 is changed from the detected state of the original S to the non-detected state thereof, the CPU 321 drives the delivery roller pair 8 by an amount corresponding to a distance for delivering the original S from the delivery sensor 15 to the delivery tray 31. With this processing, the original S is delivered to the delivery tray 31, which brings the image reading processing for one original S to an end as illustrated in FIG. 4I.

Unless the number of originals to be read is specified in the controller 400, the image reading apparatus 200 repeatedly conducts the feeding, the conveyance, the image reading, and the delivery on the original S until no original S is left on the original tray 30. In a case where the number of originals S to be read is specified and the number of originals S placed on the original tray 30 is smaller than the specified number, the image reading apparatus 200 informs that the image reading cannot be conducted on the specified number of originals S after all the originals S placed on the original tray 30 have been read. For example, the image reading apparatus 200 displays on the display of the operation unit 405 that the image reading cannot be conducted on the specified number of originals S. As illustrated in FIG. 4E, when the registration sensor 13 detects the trailing edge of the original S and the original sensor 11 detects a state where there is no original, the CPU 321 determines that the original S being conveyed is the last original. The CPU 321 stops all the motors after waiting until the last original is delivered to the delivery tray 31. Finally, the sheet feeding roller 1 returns to an original position, which brings the image reading processing to an end. The CPU 321 slightly rotates the motor in a reverse direction by bringing the clutch 307 into a connected state and positively rotates by a predetermined amount, to thereby return the sheet feeding roller 1 to the original position.

There is a case where the original S is added to the original tray 30 after all the originals S have been fed from the original tray 30 and before the reading of the originals is completed. In this case, the separation sensor 12 detects the leading edge of an added original S, and the original sensor 11 detects a state where there is an original. In this case, a predetermined time period after the separation sensor 12 detects the leading edge of the added original S, the clutch 307 connected to the separation roller 2 in order to rotate the separation roller 2 is brought into a connected state. The sheet feeding roller 1 is rotated by having the clutch 307 in a connected state, and the added original S is fed from the original tray 30. In a case where the original S is fed from the ADF 100, when there has been no change in the detection results obtained by the registration sensor 13, the read sensor 14, and the delivery sensor 15 for at least a predetermined time period, the CPU 321 determines that an original jam of the original S has occurred on the conveyance path.

For the original S conveyed along the conveyance path as described above, the scanner unit 209 reads the original image of the original S being conveyed at the reading position. The scanner unit 209 is moved to the position of the reading glass 201, and reads the original image from the original S passing through the reading position. The CCD sensor unit 210, which has received the light reflected by the original S passing through the reading position, inputs the image signal representing the original image to the controller 400. The shading using the reference white plate 219 is conducted even when the ADF 100 is used to read the original image. Immediately after the image reading processing is started, the scanner unit 209 is moved to the position immediately below the reference white plate 219, and reads the reference white plate 219. With this processing, the shading is conducted.

Tilt Correction Using Image Processing

As described above, the skew of the original can be corrected by the mechanical skew correction using the registration roller pair 3. In the mechanical skew correction, collision noise is produced when the leading edge of the original is brought into abutment with the registration roller pair 3. There is also a possibility that an appropriate loop may not be formed even when the original is brought into abutment with the registration roller pair 3 depending on a thickness of the original and the skew cannot be canceled. Therefore, the image reading apparatus 200 is also configured to be able to read the image without conducting the mechanical skew correction. The image reading apparatus 200 skips the mechanical skew correction, and therefore conducts the reading processing with the original being skew-fed. The image reading apparatus 200 conducts the image processing by the control block 20, to thereby conduct the tilt correction on the read original image. The control block 20 detects a skew amount of the original, and conducts the image processing based on the skew amount, to thereby conduct the tilt correction for the original image.

Figure 5:
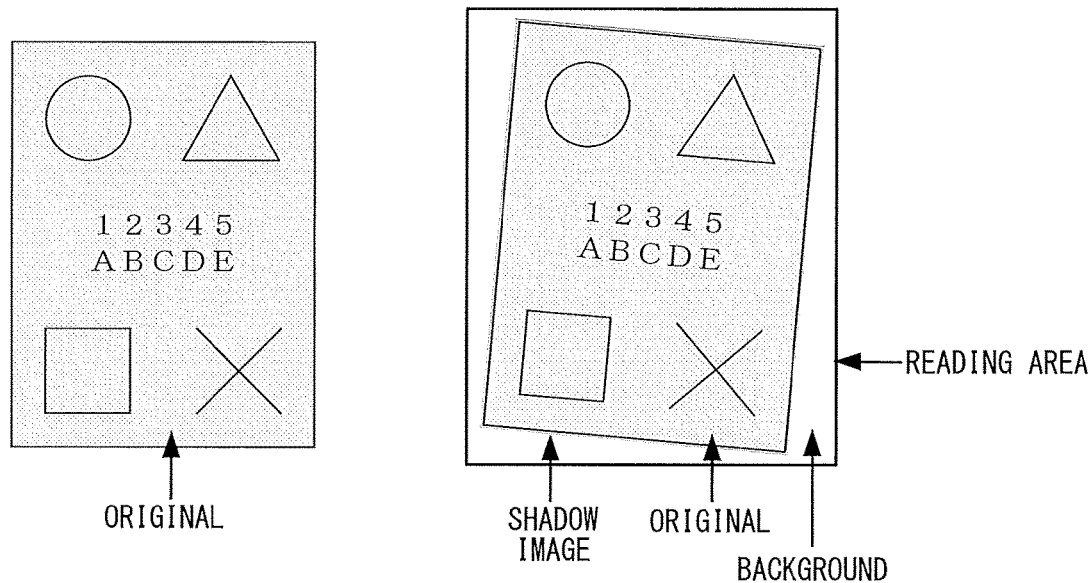
FIG. 5 is an explanatory diagram of a reading area.

FIG. 5 is an explanatory diagram of a reading area covered by the CCD sensor unit 210. The CCD sensor unit 210 starts the image reading immediately before the original is conveyed to the reading position so as to be able to read the original image even when the original reaches an upper limit of an allowable range for the skew of the ADF 100. The timing of the image reading is determined with the detection result obtained by the read sensor 14 being used as a reference. That is, the CCD sensor unit 210 starts reading the original image from a position a predetermined distance before the leading edge of the original by using the detection result obtained by the read sensor 14 as a reference. With this processing, as illustrated in FIG. 5, an image including the original being skew-fed and the platen roller 6 as a background of the original is read.

Figure 6:
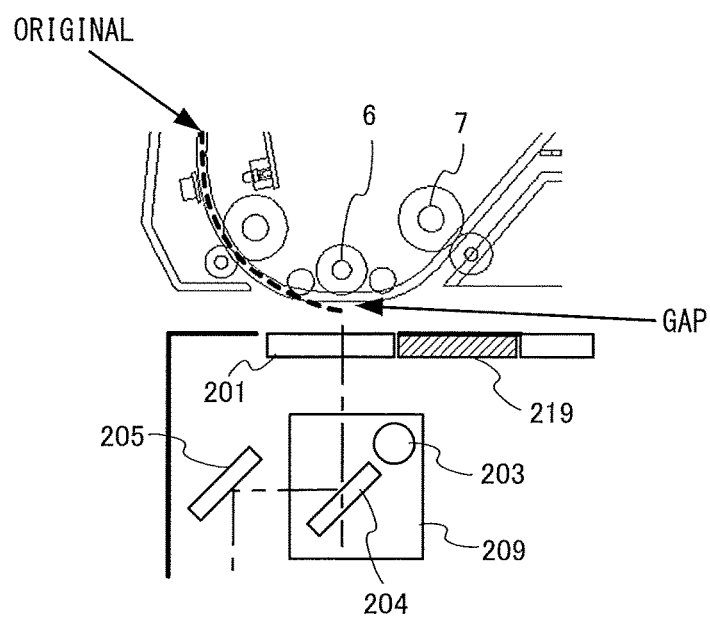
FIG. 6 is an explanatory diagram of a shadow image.

The image processor 325 extracts a boundary within the image between an original part and a background part (platen roller 6) from the image read in this manner. The image processor 325 extracts the boundary between the original part and the background part based on a shadow image corresponding to a shadow that occurs in the image read by the CCD sensor unit 210. FIG. 6 is an explanatory diagram of the shadow image. In FIG. 6, the dotted lines correspond to the original. In a case where the leading edge of the original reaches the platen roller 6 being the reading position, the leading edge of the original is not nipped by any one of the rollers. This causes a gap between the original and the platen roller 6. The gap is read as the shadow image by the CCD sensor unit 210. In the example of FIG. 5, the shadow image appears as a thin black line in a boundary portion between the original part and the background part. The image processor 325 extracts continuous positions where the shadow image forms a rectangle, determines vertices of the original image, and detects a width and a skew angle of the original image.

The image signal representing the image read by the CCD sensor unit 210 is stored in the image memory 329 as it is without being subjected to the image correction. The image processor 325 conducts the image correction, for example, the tilt correction, on the image stored in the image memory 329, extracts only an original image part, and transmits the original image part to the controller 400 as the image signal.

Figures 7A, 7B:
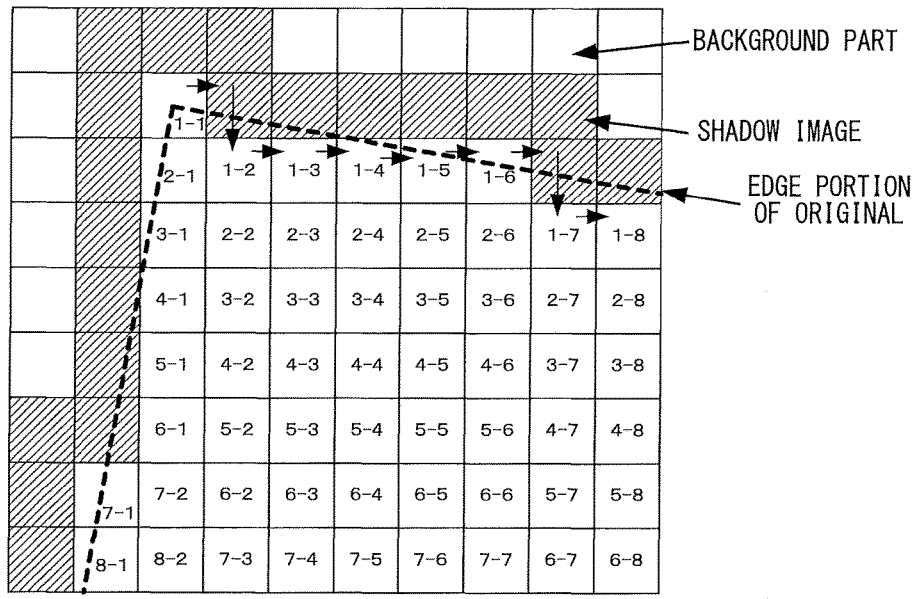
FIG. 7A and FIG. 7B are explanatory diagrams of tilt correction using image processing.

FIG. 7A and FIG. 7B are explanatory diagrams of the tilt correction using the image processing. The image processor 325 detects the width and the skew angle of the original image based on the shadow image, and controls an order of transmitting image signals to the controller 400 based on the width and the skew angle. FIG. 7A is an illustration of an image in an as-is state of being read by the CCD sensor unit 210. One square area represents one pixel. As a result of detecting the shadow image in an edge portion (portion indicated by the broken line) of the original image, the edge portion of the original image in units of pixels is located inside the diagonally shaded area. A rectangular area surrounded by four vertices (an intersection point between an original leading edge and an original left edge, an intersection point between the original leading edge and an original right edge, an intersection point between an original trailing edge and the original left edge, and an intersection point between the original trailing edge and the original right edge) of the shadow image corresponds to the original image that falls within an effective area of the original.

When transmitting the image signal to the controller 400, the image processor 325 transmits a Vsync signal being a sub-scanning reference signal representing a head of one page, and further transmits an Hsync signal being a signal representing a head in the main scanning direction. After that, the image processor 325 transmits the image signal by reading image signals corresponding to one line pixel by pixel in order from the original left edge side. When the transmission of the image signals corresponding to one line at the head is completed, the image processor 325 again transmits the Hsync signal, and then transmits image signals corresponding to the subsequent one line.

Each of areas (1-1), (1-2), (1-3), . . . within FIG. 7A is an image signal corresponding to one pixel to be transmitted to the controller 400. The area (m-n) (m and n each represents an integer) represents the n-th image signal from the left edge existing on the m-th line from the leading edge. In FIG. 7A, a next area on the right side of the area (1-1) is a shadow or an image signal that has already been transmitted after the image signal of the area (1-1) is transmitted, the image processor 325 transmits the image signal of the area (1-2), which is located immediately below the next area on the right side of the area (1-1), to the controller 400. Subsequently to the image signal of the area (1-2), the image processor 325 transmits the image signal of the area (1-3) without changing the direction because the next area on the right side is not the shadow or the image signal that has already been transmitted.

The controller 400 reproduces the original image by arranging the transmitted image signals in order as they are for each line. FIG. 7B is a diagram for exemplifying the reproduced original image. The image processor 325 thus controls the order of transmitting the original image stored in the image memory 329 to the controller 400, to thereby correct a tilt of the original image. That is, the tilt of the original image is corrected when the image signals stored in the image memory 329 are read and rearranged pixel by pixel in the order corresponding to the skew amount.

Limit of Tilt Correction

Figure 8A:
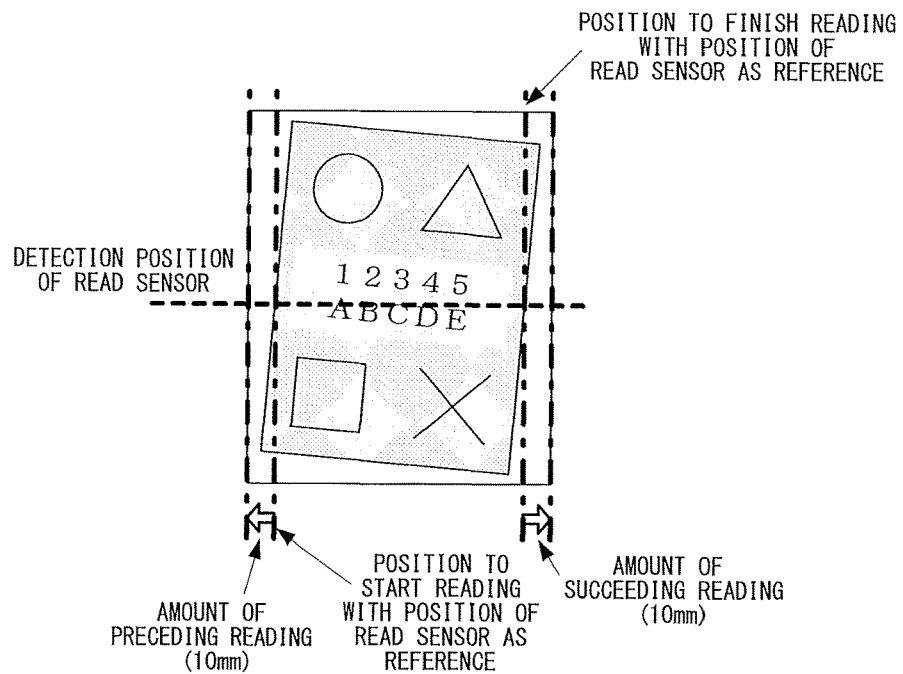
FIG. 8A and FIG. 8B are explanatory diagrams of a start timing of image reading processing.
Figure 8B:
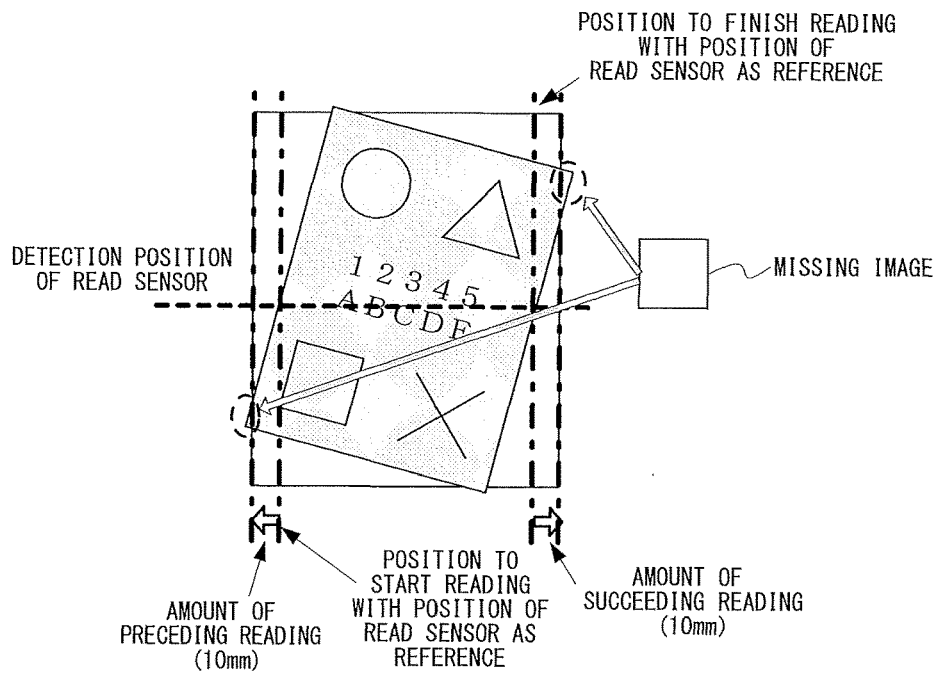

The image reading apparatus 200 determines a start timing of the image reading processing based on a timing when the read sensor 14 detects a central portion (central portion in a direction (main scanning direction) perpendicular to the conveyance direction) of the leading edge of the original. FIG. 8A and FIG. 8B are explanatory diagrams of the start timing of the image reading processing when the original is being skew-fed.

As illustrated in FIG. 8A, when the original is being skew-fed, the edge portion on any one of the left and the right of the original leading edge reaches the reading position prior to the central portion of the original leading edge in the main scanning direction. Therefore, the image reading apparatus 200 sets the start timing of the image reading processing to a timing sufficiently advanced earlier than a timing when the central portion of the original leading edge in the main scanning direction is supposed to reach the reading position. The same applies to the trailing edge of the original, and the image reading apparatus 200 continues the image reading processing until sufficient time elapses after a timing when the trailing edge of the original is detected by the read sensor 14. The image reading apparatus 200 thus reads an image of a backward part succeeding the trailing edge of the skew-fed original.

In a case where the skew angle (skew amount) of the original is large, the entire original image may fail to be read. FIG. 8B is an illustration of a case where the skew amount is large. In a case where the skew amount is large, the edge portion on any one of the left and the right of the original leading edge reaches the reading position before the start timing of the image reading, and hence original images within circular areas surrounded by the dotted lines of FIG. 8B fail to be read.

However, the original conveyed while being skew-fed too considerably is highly liable to cause an original jam. In particular, the original often causes an original jam when the leading edge is stuck on the conveyance path toward the downstream lead roller pair 7 after passing through a gap between the platen roller 6 and the reading glass 201. Therefore, when detecting that the degree of the skew of the original is too large, the image reading apparatus 200 determines that an original jam has occurred before the delivery sensor 15 detects the original. This is because it is preferred to stop the conveyance before the original causes an original jam somewhere on the conveyance path to be damaged.

Figure 9A:
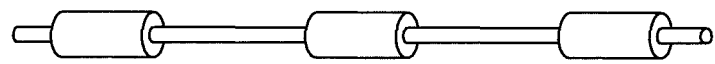
FIG. 9A and FIG. 9B are explanatory diagrams of a mechanism of an occurrence of skew of the original.
Figure 9B:
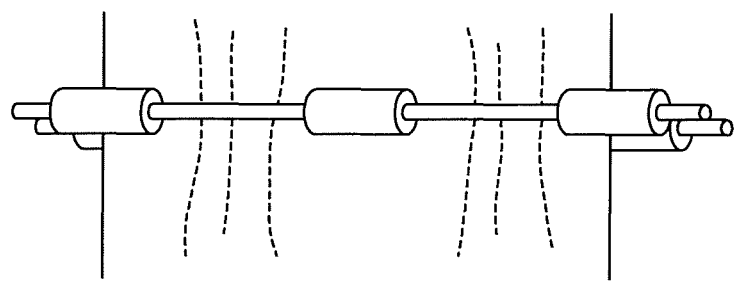
Figure 10:
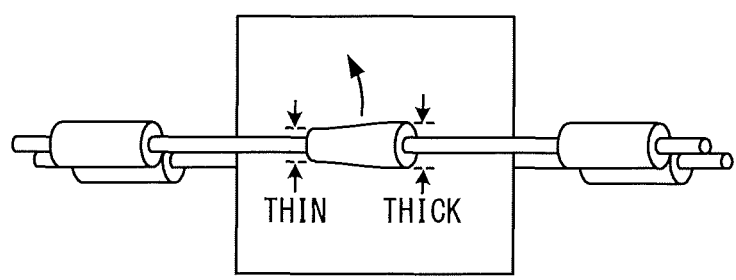
FIG. 10 is an explanatory diagram of a mechanism of the occurrence of the skew of the original.

FIG. 9A, FIG. 9B, and FIG. 10 are explanatory diagrams of a mechanism of an occurrence of skew of the original.

The original is liable to be skew-fed when the width in the main scanning direction is narrower than the width of the roller on the conveyance path. As illustrated in FIG. 9A, the roller has a structure having a metal shaft at its center and rubber wound around part of the shaft. The registration roller pair 3, the conveyance roller pair 4, the upstream lead roller pair 5, the downstream lead roller pair 7, and the delivery roller pair 8 are each structured such that a pair of rollers having such a structure is arranged across the conveyance path. In a case of using a roller structured to have rubber wound around the entire shaft, a wrinkle occurs in the original in a part that exhibits unevenness in circumferential length of the rubber. Therefore, the rubber is wound around part of the shaft. In the example of FIG. 9A, the rubber is provided at three positions on the shaft. The roller pair is thus structured, and hence, as illustrated in FIG. 9B, the wrinkle in the original can be absorbed in a gap between rubber and rubber.

The roller pair having such a structure nips only part of the original when the original has a small width. In the example of FIG. 10, the original is conveyed by being nipped by a pair of rubber portions. In this case, a conveyance force in a rotational direction varies due to the unevenness in circumferential length of the rubber, which causes the original to be liable to be skew-fed. The rubber used for the roller is liable to cause unevenness in diameter of the rubber particularly provided to the central portion of the shaft due to friction involved in the use. In the example of FIG. 10, the right side of the rubber provided to the central portion of the shaft is thicker, and the left side thereof is thinner. Under such a state, the conveyance force on the right side is stronger, which causes the original to be liable to be skew-fed toward the left side. Under such a state where the original is liable to be skew-fed, it is effective not only to conduct the tilt correction using the image processing but also to conduct the mechanical skew correction before the original reaches the reading position.

Image Reading Processing

As described above, in the mechanical skew correction, in order to reduce the collision noise produced between the original and the registration roller pair 3, it is desired to conduct the tilt correction using the image processing. When the original is being skew-fed considerably, it is desired to stop the conveyance immediately and suppress damage done to the original. When the original is liable to be skew-fed due to the kind of original, the state of the roller, or other such factor, it is desired to conduct the mechanical skew correction.

Figure 11:
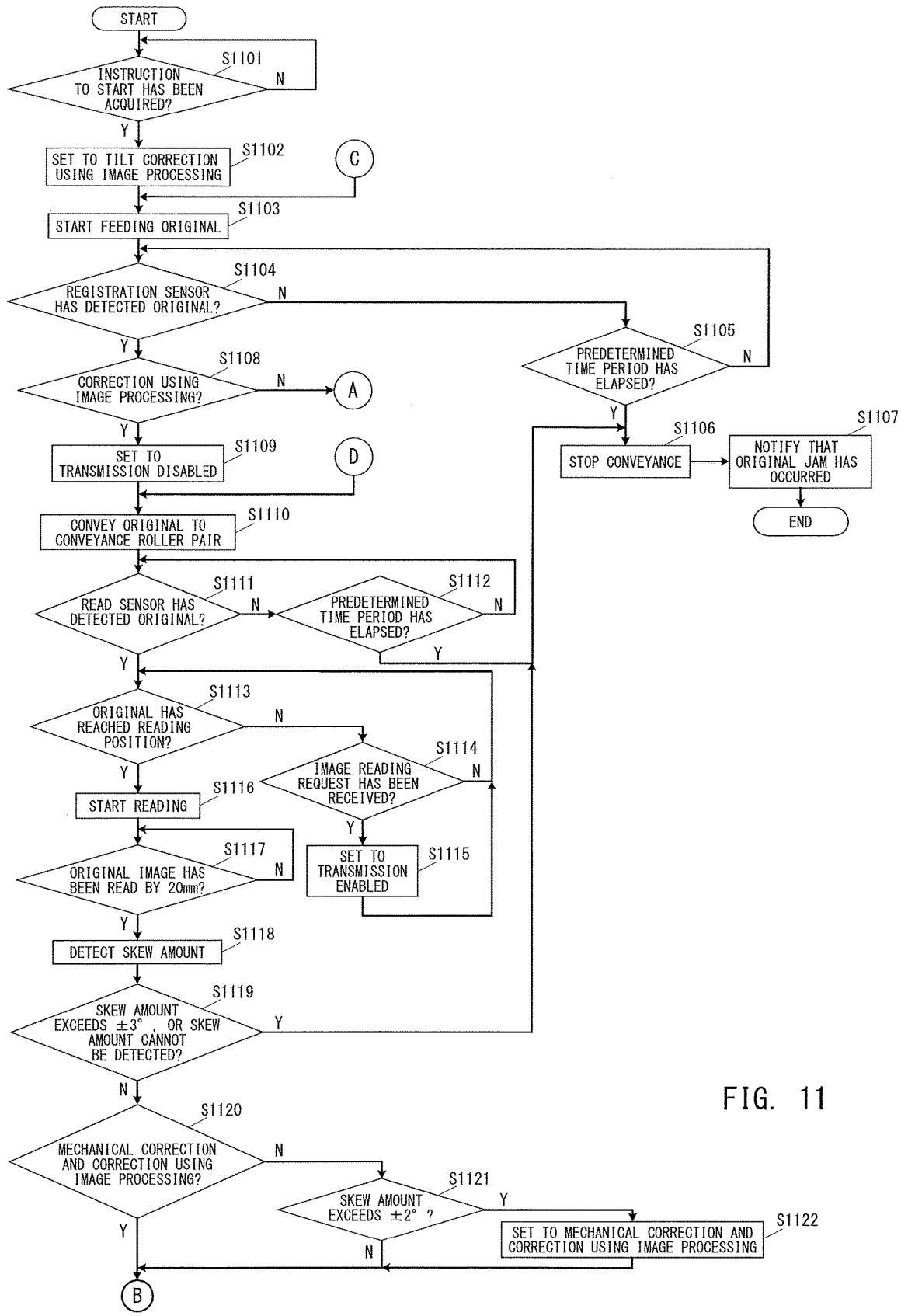
FIG. 11 is a flowchart for illustrating the image reading processing.
Figure 12:
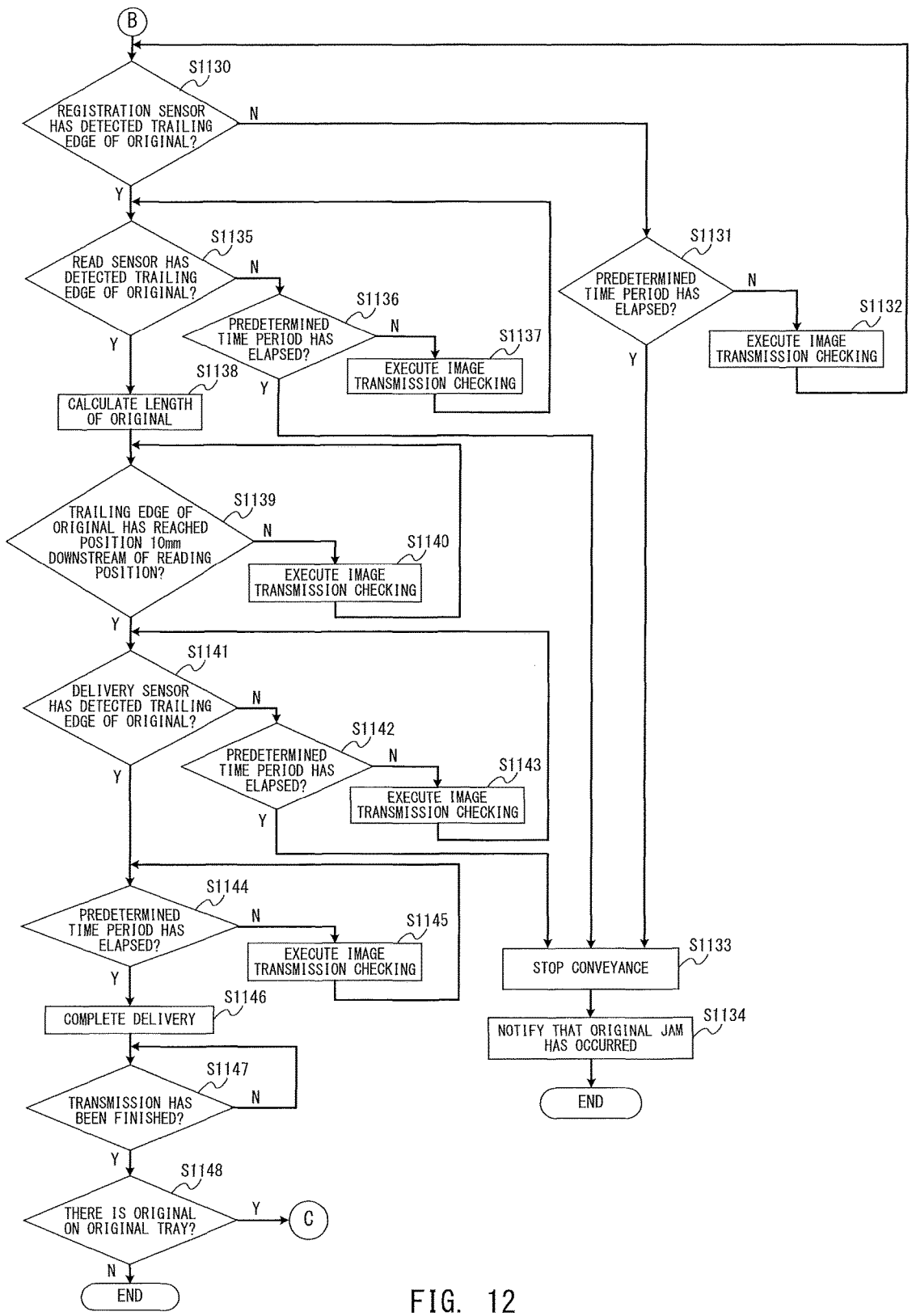
FIG. 12 is a flowchart for illustrating the image reading processing.
Figure 13:
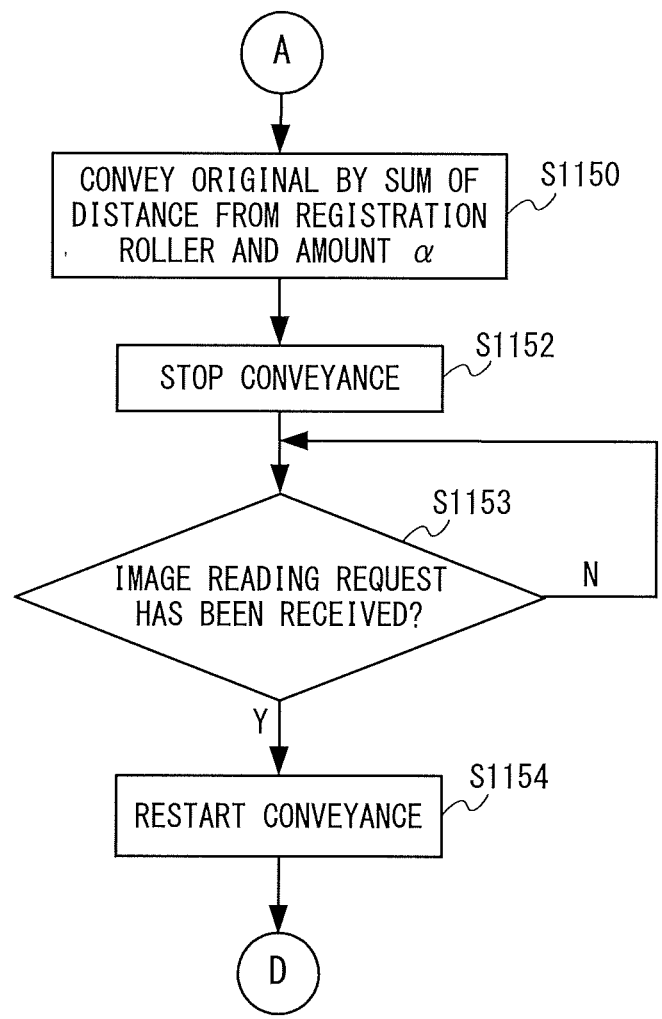
FIG. 13 is a flowchart for illustrating the image reading processing.

To that end, the image reading apparatus 200 executes the image reading processing while switching between the mechanical skew correction and the tilt correction using the image processing. FIG. 11, FIG. 12, and FIG. 13 are flowcharts for illustrating the image reading processing including the switching processing between those kinds of skew correction.

The CPU 321 acquires an instruction to start the reading processing for the original image from the operation unit 405 (Y in Step S1101), to thereby start the image reading processing. The CPU 321 first sets a skew correction method S type to the tilt correction using the image processing before the first original is fed (Step S1102). The CPU 321, which has set the skew correction method S_type, rotationally drives the sheet feeding roller 1 and the separation roller 2 to feed the originals from the original tray 30 one by one (Step S1103). The CPU 321 stands by until the registration sensor 13 detects the original after the original is fed (Step S1104). When a predetermined time period elapses before the registration sensor 13 detects the original (N in Step S1104 and Y in Step S1105), the CPU 321 determines that the original has failed to be normally fed due to an original jam or the like. In this case, the CPU 321 stops the conveyance of the original (Step S1106), notifies the controller 400 that an original jam has occurred, and brings the processing to an end (Step S1107).

When the original is normally fed and the registration sensor 13 detects the original (Y in Step S1104), the CPU 321 determines whether or not the skew correction method S_type is set to only the tilt correction using the image processing (Step S1108). Processing conducted when the skew correction method S_type is not set to only the tilt correction using the image processing (N in Step S1108) is described later. When the skew correction method S_type is set to the tilt correction using the image processing (Y in Step S1108), the CPU 321 sets an image transmission state Tsts, which represents a state of transmitting the image signal, to transmission disabled (Step S1109). After that, the CPU 321 conveys the fed original to the conveyance roller pair 4 without subjecting the original to the mechanical skew correction by the registration roller pair 3 (Step S1110). The CPU 321 stands by until the read sensor 14 detects the original (Step S1111). When a predetermined time period elapses before the read sensor 14 detects the original (N in Step S1111 and Y in Step S1112), the CPU 321 determines that the original has failed to be normally fed due to an original jam or the like. In this case, the CPU 321 stops the conveyance of the original (Step S1106), notifies the controller 400 that an original jam has occurred, and brings the processing to an end (Step S1107).

When the read sensor 14 detects the original (Y in Step S1111), the CPU 321 starts counting the clock of the motor 303 configured to drive the upstream lead roller pair 5 and the platen roller 6 at a timing when the read sensor 14 detects the original. The CPU 321 determines whether or not the leading edge of the original has reached the reading position based on the counted clock number (Step S1113). The CPU 321 starts reading the original image at a timing when the original reaches the reading position. In this case, the timing when the original reaches the reading position is not a time point when the leading edge of the original actually reaches the reading position but the timing advanced earlier than the timing when the original leading edge is supposed to reach the reading position as illustrated in FIG. 8A, for example, a timing advanced by 10 mm.

Before the leading edge of the original reaches a position 10 mm upstream of the reading position in the conveyance direction (N in Step S1113), the CPU 321 determines whether or not the image reading request for the original has been received from the controller 400 (Step S1114). When the image reading request has been received (Y in Step S1114), the CPU 321 sets the image transmission state Tsts to transmission enabled (Step S1115).

When the leading edge of the original reaches the position 10 mm upstream of the reading position in the conveyance direction (Y in Step S1113), the CPU 321 starts reading the original image by the CCD sensor unit 210 (Step S1116). The CCD sensor unit 210 stores the image signal representing the read original image in the image memory 329 as the need arises. When the original image is read before the image reading request is received, the image signal representing the read original image is temporarily stored in the image memory 329, and then transmitted to the controller 400 based on image transmission checking described later.

When the CCD sensor unit 210 reads, from the original, the original image by 20 mm in the conveyance direction (Y in Step S1117), the CPU 321 detects the skew amount of the original (Step S1118). In the first embodiment, a skew amount that can be corrected is ±3° with respect to the main scanning direction, and a maximum length of the main scanning direction is set to 297 mm.

Figure 14:
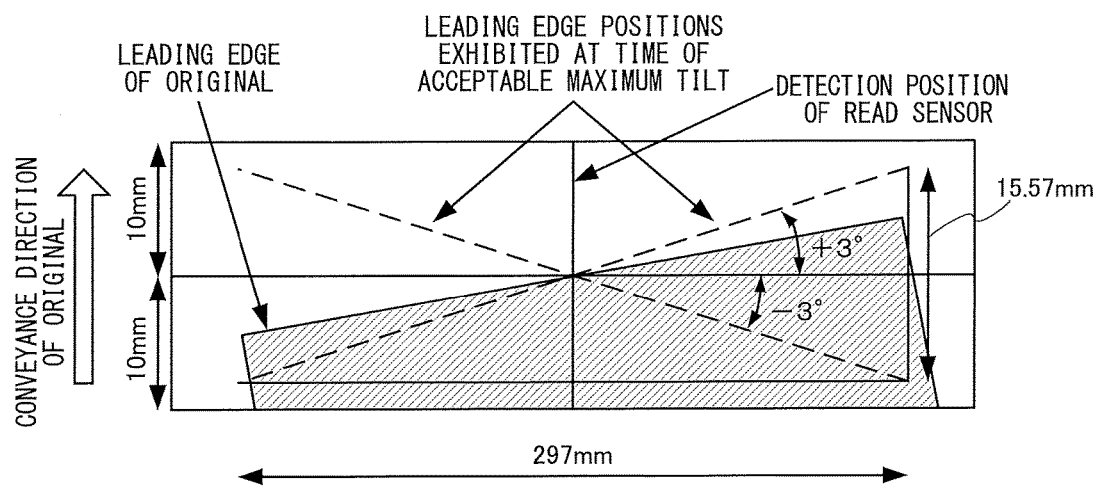
FIG. 14 is an explanatory diagram of detection of a skew amount.

FIG. 14 is an explanatory diagram of detection of the skew amount of the original. FIG. 14 is an illustration of a result of reading the original image by 20 mm in the conveyance direction. The diagonally shaded part within FIG. 14 corresponds to an image obtained by reading the original. The read sensor 14 is arranged at the center position in the main scanning direction (center position in the left-right direction of FIG. 14). The CPU 321 starts reading the image when the leading edge of the original detected by the read sensor 14 reaches a position 10 mm before the reading position. The CPU 321 detects the skew amount of the original through use of the original image read while the original is conveyed by 10 mm after the leading edge of the original detected by the read sensor 14 reaches the reading position. Therefore, in the original image for detecting the skew amount of the original, which has been read by 20 mm in the conveyance direction, the leading edge of the original detected by the read sensor 14 is arranged in the center of the image at a timing of reaching the reading position. The original has a maximum length of 297 mm in the main scanning direction and an expected maximum tilt of 3°, and hence it is possible to detect the skew amount of the original by reading the image having a length of at least)"tan(3°)× 297 mm=15.57 mm" in the conveyance direction. When the left edge and the right edge of a leading edge portion of the original cannot be detected even after the original image is read by 20 mm in the conveyance direction, this means that the absolute value of the skew amount exceeds the absolute value of ±3°. In this case, the limit of the skew correction of the first embodiment is exceeded, and hence the correction cannot be conducted.

In a case where the absolute value of the detected skew amount exceeds the absolute value of ±3° or when the skew amount cannot be detected (Y in Step S1119), the CPU 321 stops the conveyance of the original (Step S1106), notifies the controller 400 that an original jam has occurred, and brings the processing to an end (Step S1107). That is, the image reading apparatus 200 sets the absolute value of the skew amount of ±3° as a first threshold value, and stops the conveyance of the original being skew-fed with the skew amount having an absolute value exceeding the first threshold value.

In a case where the absolute value of the detected skew amount does not exceed the absolute value of ±3° (N in Step S1119), the CPU 321 determines whether or not the skew correction method S_type is set to both the mechanical skew correction and the tilt correction using the image processing (Step S1120). In a case where the skew correction method S_type is set to only one of the mechanical skew correction and the tilt correction using the image processing (N in Step S1120), the CPU 321 determines whether or not the absolute value of the detected skew amount exceeds the absolute value of ±2° (Step S1121). In a case where the absolute value of the skew amount does not exceed the absolute value of ±2° (N in Step S1121), the CPU 321 continues to have the skew correction method S_type set to only any one of the mechanical skew correction and the tilt correction using the image processing. In a case where the absolute value of the skew amount exceeds the absolute value of ±2° (Y in Step S1121), the CPU 321 sets the skew correction method S_type to both the mechanical skew correction and the tilt correction using the image processing (Step S1122). In a case where the skew correction method S_type is set to both the mechanical skew correction and the tilt correction using the image processing, the mechanical skew correction and the tilt correction using the image processing are conducted on the originals to be fed subsequently. That is, the image reading apparatus 200 sets the absolute value of the skew amount of ±2° as a second threshold value, and when the detected skew amount has an absolute value between the first threshold value and the second threshold value, conducts the mechanical skew correction on the subsequent originals while conducting the tilt correction using the image processing on the read original image. In a case where the skew correction method S_type is set to both the mechanical skew correction and the tilt correction using the image processing (Y in Step S1120), the skew correction method S_type is left unchanged irrespective of the skew amount.

In a case where the skew correction method S_type is set to both the mechanical skew correction and the tilt correction using the image processing, the mechanical skew correction using the registration roller pair 3 is conducted. After that, when the absolute value of the skew amount detected in the processing of Step S1118 is smaller than the absolute value of ±3°, the tilt correction using the image processing is conducted. The conveyance of the original is stopped when the absolute value of the skew amount exceeds the absolute value of ±3° in the processing of Step S1119 irrespective of which of the mechanical skew correction and the tilt correction using the image processing the skew correction method S_type is set to.

After determining the skew correction method S_type, the CPU 321 executes the processing illustrated in the flowchart of FIG. 12. The CPU 321 detects whether or not the trailing edge of the original has reached the detection position of the registration sensor 13 based on whether or not the detection result obtained by the registration sensor 13 has been changed from the state where the original exists to the state where the original does not exist (Step S1130). The CPU 321 repeatedly executes the image transmission checking until the trailing edge of the original reaches the detection position of the registration sensor 13 (N in Step S1130, N in Step S1131, and Step S1132). The image transmission checking is described later in detail. When the trailing edge of the original does not reach the detection position of the registration sensor 13 even after a predetermined time period has elapsed (N in Step S1130 and Y in Step S1131), the CPU 321 finishes the image transmission checking, and determines that the original has failed to be normally fed due to an original jam or the like. In this case, the CPU 321 stops the conveyance of the original (Step S1133), notifies the controller 400 that an original jam has occurred, and brings the processing to an end (Step S1134). The predetermined time period represents a sum of a margin time period and a time period required after the leading edge of the original reaches the registration sensor 13 until the trailing edge has passed through the registration sensor 13.

After the trailing edge of the original has reached the detection position of the registration sensor 13 (Y in Step S1130), the CPU 321 determines whether or not the detection result obtained by the read sensor 14 has been changed from the state where the original exists to the state where the original does not exist. With this processing, the CPU 321 determines whether or not the trailing edge of the original has reached the detection position of the read sensor 14 (Step S1135). The CPU 321 repeatedly executes the image transmission checking described later until the trailing edge of the original reaches the detection position of the read sensor 14 (N in Step S1135, N in Step S1136, and Step S1137). When the trailing edge of the original does not reach the detection position of the read sensor 14 even after a predetermined time period has elapsed (N in Step S1135 and Y in Step S1136), the CPU 321 finishes the image transmission checking, stops the conveyance of the original (Step S1133), notifies the controller 400 that an original jam has occurred, and brings the processing to an end (Step S1134). The predetermined time period represents a sum of a margin time period and a time period required after the leading edge of the original reaches the read sensor 14 until the trailing edge has passed through the read sensor 14.

When the trailing edge of the original reaches the detection position of the read sensor 14 (Y in Step S1135), the CPU 321 determines the length of the original in the conveyance direction (Step S1138). The CPU 321 counts a drive clock of the motor between the timing when the read sensor 14 detects the leading edge of the original in the processing of Step S1111 and the timing when the read sensor 14 detects the trailing edge of the original in the processing of Step S1135. The CPU 321 determines the length of the original in the conveyance direction (sub-scanning direction) based on the counted number and the conveyance amount of the original per drive clock of the conveyance motor.

The CPU 321 continues the image reading conducted by the CCD sensor unit 210 until a timing when the trailing edge of the original is predicted to reach a position 10 mm downstream of the reading position in the conveyance direction (Step S1139). The original image is read by extra 10 mm, and hence, as illustrated in the trailing edge side of FIG. 8A (on the right side of FIG. 8A), the image on the trailing edge side of the original, which is obtained after the trailing edge of the original is detected with the position of the read sensor 14 as a reference, can be used for the skew correction. While continuing the image reading, the CPU 321 repeatedly executes the image transmission checking (N in Step S1139 and Step S1140).

When the trailing edge of the original reaches a position 10 mm downstream of the reading position in the conveyance direction (Y in Step S1139), the CPU 321 stands by until the delivery sensor 15 detects the trailing edge of the original (Step S1141). The CPU 321 repeatedly executes the image transmission checking described later until the trailing edge of the original reaches the detection position of the delivery sensor 15 (N in Step S1141, N in Step S1142, and Step S1143). When the trailing edge of the original does not reach the detection position of the delivery sensor 15 even after a predetermined time period has elapsed (N in Step S1141 and Y in Step S1142), the CPU 321 finishes the image transmission checking, stops the conveyance of the original (Step S1133), notifies the controller 400 that an original jam has occurred, and brings the processing to an end (Step S1134). The predetermined time period represents a sum of a margin time period and a time period required after the leading edge of the original reaches the delivery sensor 15 until the trailing edge has passed through the delivery sensor 15.

After the trailing edge of the original passes through the detection position of the delivery sensor 15 (Y in Step S1141), the CPU 321 stands by for a predetermined time period until the original is delivered to the delivery tray 31 (Step S1144). The CPU 321 keeps executing the image transmission checking Step S1145 during the standby time period (N in Step S1144 and Step S1145). When the original is delivered to the delivery tray 31 after a predetermined time period has elapsed (Y in Step S1144), the CPU 321 notifies the controller 400 that the delivery has been completed (Step S1146).

After notifying the controller 400 that the delivery has been completed, the CPU 321 determines whether or not the transmission of the image signal to the controller 400 has been finished based on the image transmission state Tsts (Step S1147). When the transmission of the image signal has not been finished (N in Step S1147), the CPU 321 stands by until the transmission is finished. The image memory 329 has a small storage capacity, and cannot store the image signal representing the original image of a succeeding original unless the transmission of the image signal is finished. Therefore, the CPU 321 stands by. In the first embodiment, the storage capacity of the image memory 329 has a size capable of storing the image signal corresponding to one whole surface of an original of a maximum size (for example, A3 size) allowed for the placement on the original tray 30. This inhibits the CPU 321 from starting reading the succeeding original before the transmission of the image signal to the controller 400 is completed. However, in a case where the storage capacity of the image memory 329 has a size for at least two whole surfaces of originals, the CPU 321 can start reading the succeeding original when a size for at least one whole surface remains in the free storage area.

When the transmission of the image signal is finished (Y in Step S1147), the CPU 321 determines whether or not there is an original left on the original tray 30 by the original sensor 11 (Step S1148). When there is an original left on the original tray 30 (Y in Step S1148), the CPU 321 repeatedly conducts the processing of Step S1103 and the subsequent steps. When there is no original left on the original tray 30 (N in Step S1148), the CPU 321 brings the reading processing for the original image to an end.

A description is made of processing conducted when it is determined in the processing of Step S1108 described above that the tilt correction is not set to only the tilt correction using the image processing (N in Step S1108), that is, when the skew correction method S_type is set to both the mechanical skew correction and the tilt correction using the image processing. FIG. 13 is a flowchart for illustrating the processing conducted in such a case.

The CPU 321 conveys the original by a sum of a distance for causing the leading edge to reach the registration roller pair 3 and an amount α (Step S1150). The amount α represents a conveyance amount required for bending the original by a predetermined amount. At this time, the registration roller pair 3 is in a stopped state. Therefore, the original is conveyed by the amount α with the leading edge in abutment with the registration roller pair 3. As a result, a predetermined amount of bend is formed in the original. When the predetermined amount of bend is formed, the CPU 321 stops the rotation of the separation roller 2 to stop the conveyance of the original (Step S1152). With this processing, the mechanical skew correction is conducted on the original. The CPU 321 stands by under that state until the image reading request is received from the controller 400 (N in Step S1153). When receiving the image reading request (Y in Step S1153), the CPU 321 rotationally drives the registration roller pair 3 and the separation roller 2 to restart the conveyance of the original (Step S1154), and conducts the processing of Step S1110 and the subsequent steps. With the above-mentioned processing, the skew of the original is suppressed before the original leading edge reaches the reading position.

Figure 15:
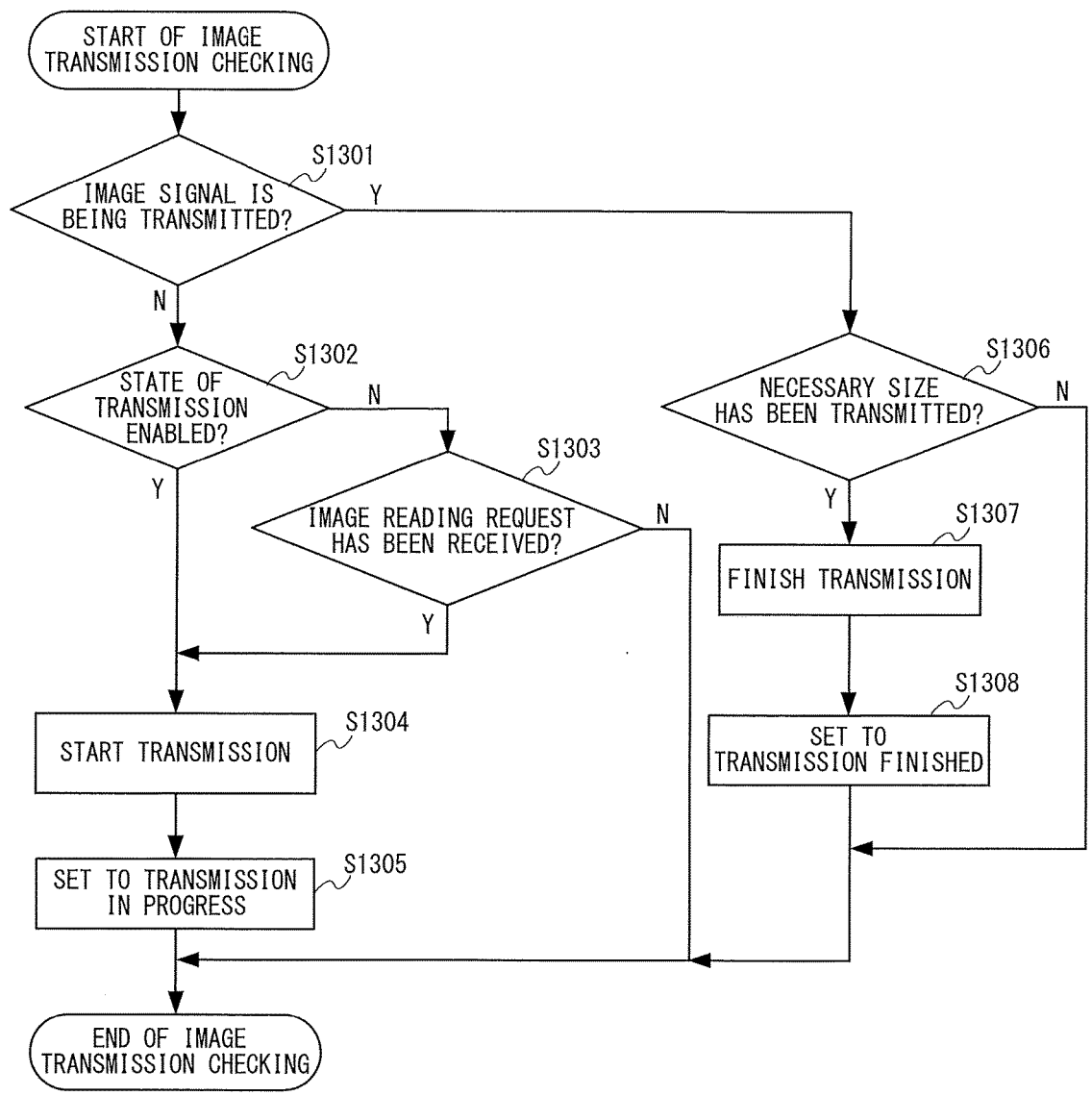
FIG. 15 is a flowchart for illustrating image transmission checking processing.

A description is made of image transmission checking processing illustrated in Step S1132, Step S1137, Step S1140, Step S1143, and Step S1145 of FIG. 12. FIG. 15 is a flowchart for illustrating the image transmission checking processing. The image signal stored in the image memory 329 is transmitted to the controller 400 by the image transmission checking processing. When the image transmission state Tsts is set to image transmission enabled before the reading of the original image is started (Step S1115 of FIG. 11), the CPU 321 reads the image signal from the image memory 329 and transmits the image signal to the controller 400 by the image transmission checking processing. In this case, the image processor 325 conducts the tilt correction using the image processing.

In the image transmission checking processing, the CPU 321 first determines whether or not the image signal is being transmitted based on the image transmission state Tsts (Step S1301). When the image signal is not being transmitted (N in Step S1301), the CPU 321 verifies whether or not the image transmission state Tsts is set to the state of image transmission enabled (Step S1302). As illustrated in the processing of Step S1115, when the CPU 321 receives the image reading request from the controller 400 before the image reading, the image transmission state Tsts is set to the state of image transmission enabled.

When the image transmission state Tsts is set to the state of image transmission enabled (Y in Step S1302), the CPU 321 transmits the image signal from the image memory 329 to the controller 400 while conducting the tilt correction using the image processing by the image processor 325 (Step S1304). When starting the transmission of the image signal, the CPU 321 sets the image transmission state Tsts to image transmission in progress, and brings the image transmission checking processing to an end (Step S1305).

When the image transmission state Tsts is not set to the state of image transmission enabled (N in Step S1302), the CPU 321 verifies whether or not the image reading request has been transmitted from the controller 400 (Step S1303). When receiving the image reading request (Y in Step S1303), the CPU 321 starts transmitting the image signal to the controller 400, and conducts the processing of Step S1304 and the subsequent steps. In this case, the image processor 325 conducts the tilt correction using the image processing. When the image reading request has not been received (N in Step S1303), the CPU 321 brings the image transmission checking processing to an end without transmitting the image signal to the controller 400.

In a case where it is determined in Step S1301 that the image signal is being transmitted (Y in Step S1301), the CPU 321 examines a data size of the transmitted image signal. The data size of the image signal requested to be transmitted is set in the image reading request transmitted from the controller 400. The CPU 321 determines whether or not the image signal corresponding to the data size set in the image reading request has been transmitted (Step S1306). When the image signal corresponding to the data size set in the image reading request has been transmitted (Y in Step S1306), the CPU 321 finishes the transmission of the image signal to the controller 400, and sets the image transmission state Tsts to image transmission finished (Step S1307 and Step S1308). When the image signal corresponding to the data size set in the image reading request has not been transmitted (N in Step S1306), the CPU 321 brings the image transmission checking processing to an end.

The image transmission checking processing is conducted in Step S1132, Step S1137, Step S1140, Step S1143, and Step S1145. It suffices that the CPU 321 transmits the image signal corresponding to the data size set in the image reading request by the processing of those steps and Step S1147. Therefore, there is no problem even when it is determined in Step S1306 that the image signal corresponding to the data size set in the image reading request has not been transmitted.

The image reading apparatus 200 having the above-mentioned configuration determines whether or not to execute the mechanical skew correction based on the skew amount of the original. In a case where the absolute value of the skew amount of the original exceeds a limit value (first threshold value) that allows the correction, the image reading apparatus 200 suspends the reading processing for the original image to stop the conveyance of the original. In a case where the absolute value of the skew amount is a little smaller value than the limit value that allows the correction (between the first threshold value and the second threshold value), the image reading apparatus 200 determines that there is a fear of exceeding the limit value, and conducts the mechanical skew correction at a time of the conveyance of the subsequent originals, to thereby be able to inhibit the skew amount from easily reaching the limit value. With this configuration, the image reading apparatus 200 can achieve efficient skew correction, reduce a fear that the image reading processing is suspended even when the skew amount is large, and improve usability.

Second Embodiment

The image reading apparatus 200 having the same configuration as that of the first embodiment may be used to read the original image by the following processing. In a second embodiment of the present invention, the CPU 321 is also configured to detect the skew amount of the original based on the image read by the CCD sensor unit 210. The CPU 321 stops the conveyance of the original when the absolute value of the skew amount of the original exceeds the first threshold value. The CPU 321 uses in combination the mechanical skew correction and the tilt correction using the image processing when the absolute value of the skew amount of the original exceeds the second threshold that is smaller than the first threshold value. The CPU 321 switches the setting of the skew correction so as to use in combination the mechanical skew correction when there are a series of a predetermined number of originals exhibiting a skew amount having an absolute value exceeding a third threshold value that is smaller than the second threshold value.

Figure 16:
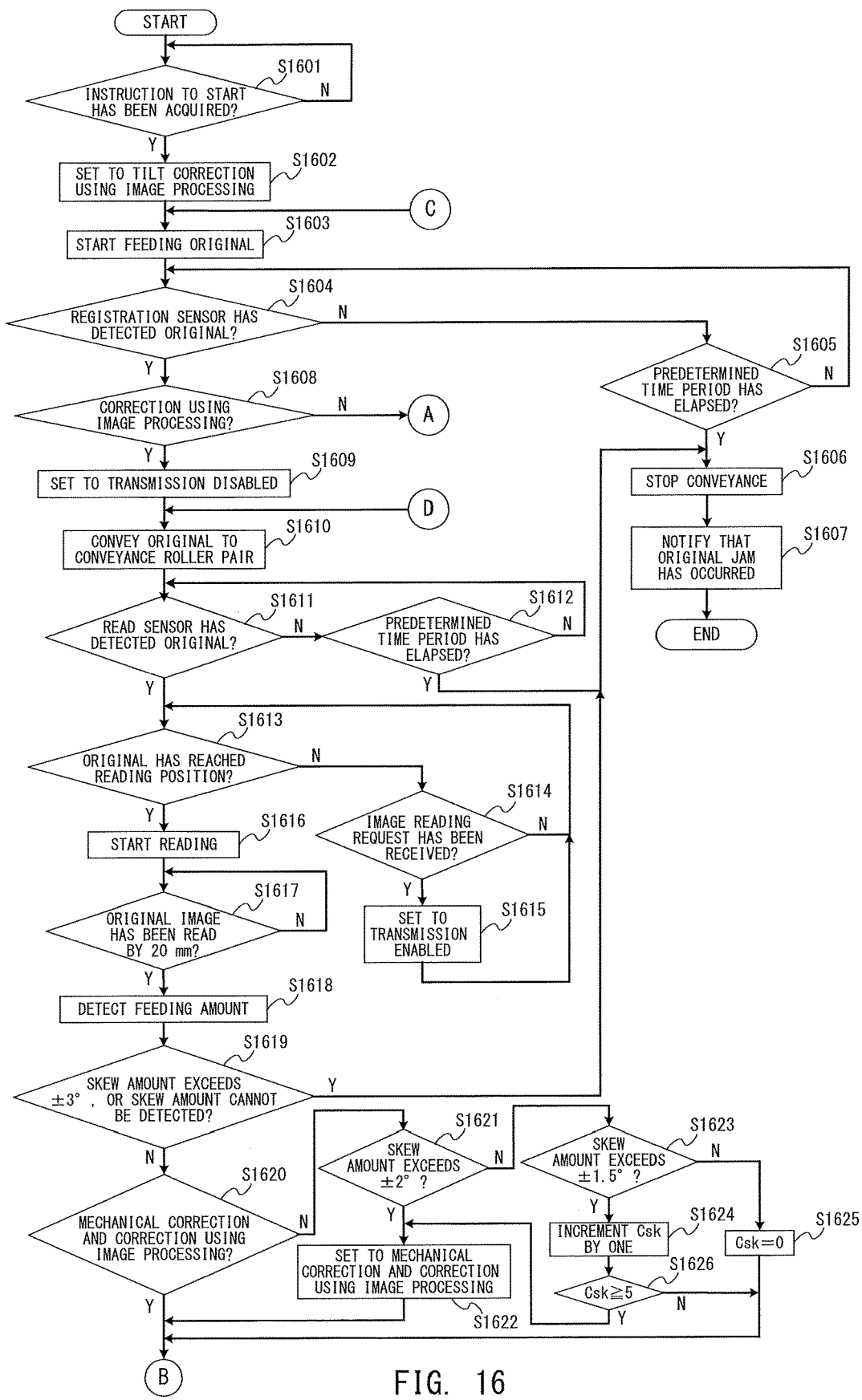
FIG. 16 is a flowchart for illustrating the image reading processing.

FIG. 16 is a flowchart for illustrating the image reading processing according to the second embodiment. The processing (Step S1601 to Step S1618) from the feeding of the original to the detection of the skew amount of the original is the same processing as the processing of from Step S1101 to Step S1118 illustrated in FIG. 11 of the first embodiment, and hence a description thereof is omitted. The processing conducted when the absolute value of the skew amount exceeds the absolute value of ±3° or when the skew amount cannot be detected (Step S1619) is the same as the processing of Step S1119 of the first embodiment, and hence a description thereof is omitted. In a case where the skew correction method S_type is set to the mechanical skew correction and the tilt correction using the image processing (Y in Step S1620), the subsequent processing is the same as the processing of FIG. 12 of the first embodiment, and hence a description thereof is omitted.

In a case where the absolute value of the skew amount of the original detected in the processing of Step S1618 exceeds the absolute value of ±2° (Y in Step S1621), the skew correction method S_type is set in the same manner as in Step S1122 of the first embodiment (Step S1622).

In a case where the absolute value of the skew amount of the original is equal to or smaller than the absolute value of ±2° (N in Step S1621), the CPU 321 determines whether or not the absolute value of the skew amount exceeds the absolute value of ±1.5° (Step S1622). In a case where the absolute value of the skew amount exceeds the absolute value of ±1.5° (Y in Step S1623), the CPU 321 increments a skew counter Csk by one (Step S1624). In a case where the absolute value of the skew amount is equal to or smaller than the absolute value of ±1.5° (N in Step S1623), the CPU 321 resets the skew counter Csk to "0" (Step S1625). It is noted that the skew counter Csk is a counter for determining whether or not to use the mechanical skew correction and the tilt correction using the image processing in combination. The skew counter Csk is provided in the CPU 321.

In a case where the skew counter Csk is equal to or larger than "5" (Y in Step S1626), the CPU 321 sets the skew correction method S_type to the mechanical skew correction and the tilt correction using the image processing (Step S1622). This is processing for preventing the absolute value of the skew amount from exceeding the absolute value of ±3° with a little disturbance because the original continues to be skew-fed. That is, the image reading apparatus 200 sets the absolute value of the skew amount of ±1.5° as the third threshold value, and when the detected skew amount has an absolute value between the second threshold value and the third threshold value a predetermined number of times in a row, conducts the mechanical skew correction and the tilt correction using the image processing in the subsequent processing. In a case where the skew correction method S_type is set to the mechanical skew correction and the tilt correction using the image processing, the skew amount is detected based on the read image after the mechanical skew correction is conducted. Therefore, even when the absolute value of the skew amount of the subsequent originals is small, the skew correction method S_type is inhibited from being set to only the tilt correction using the image processing.

In a case where the skew counter Csk is smaller than "5" (N in Step S1626) or after the skew counter Csk is reset to "0", the CPU 321 conducts the processing illustrated in FIG. 12.

The image reading apparatus 200 according to the second embodiment described above detects the skew amount of the original and determines whether or not to conduct the mechanical skew correction based on a result of the detection. In a case where the absolute value of the skew amount of the original is equal to or larger than the third threshold value (in this case, the absolute value of ±1.5°) for a predetermined number of originals in a row, the image reading apparatus 200 conducts the mechanical skew correction on the subsequent originals in advance before the image reading in order to prevent the skew amount from exceeding the limit of correction due to abrupt skew to cause the reading of the original to be stopped immediately. This allows the image reading apparatus 200 to inhibit the skew amount from easily reaching the limit.

Third Embodiment

The image reading apparatus 200 having the same configuration as that of the first embodiment may be used to read the original image by the following processing. In a third embodiment of the present invention, the skew correction method S_type has two kinds of correction, namely, the mechanical skew correction and the tilt correction using the image processing, and a combination of the mechanical skew correction and the tilt correction using the image processing is not used as the skew correction method S_type. In the third embodiment, the CPU 321 is also configured to detect the skew amount of the original based on the image read by the CCD sensor unit 210. The CPU 321 stops the conveyance of the original when the absolute value of the skew amount of the original exceeds the first threshold value. The CPU 321 conducts only the mechanical skew correction when the absolute value of the skew amount of the original exceeds the second threshold that is smaller than the first threshold value.

Figure 17:
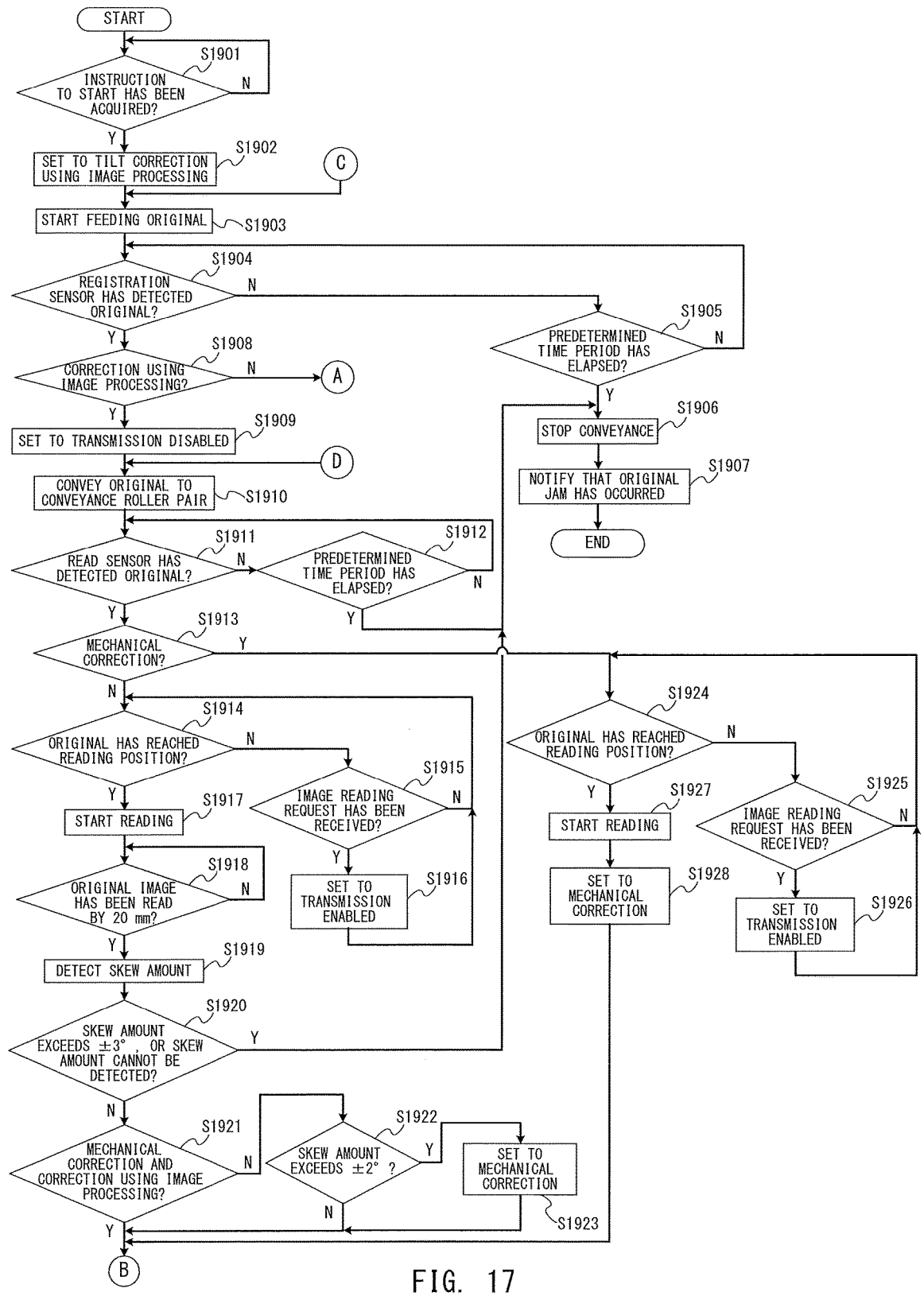
FIG. 17 is a flowchart for illustrating the image reading processing.

FIG. 17 is a flowchart for illustrating the image reading processing according to the third embodiment. The processing (Step S1901 to Step S1912) from the feeding of the original to the detection of the original by the read sensor 14 is the same processing as the processing of from Step S1101 to Step S1112 illustrated in FIG. 11 of the first embodiment, and hence a description thereof is omitted.

When the read sensor 14 detects the original (Y in Step S1911), the CPU 321 determines whether or not the skew correction method S_type is set to the mechanical skew correction (Step S1913). In a case where the skew correction method S_type is not set to the mechanical skew correction (N in Step S1913), the skew correction method S_type is set to the tilt correction using the image processing. In this case, the CPU 321 conducts the same processing as the processing of Step S1113 and the subsequent steps of the first embodiment illustrated in FIG. 11 (processing of Step S1914 and the subsequent steps). In a case where the absolute value of the skew amount exceeds the absolute value of ±2° (Y in Step S1922), the CPU 321 sets the skew correction method S_type to the mechanical skew correction unlike in the first embodiment (Step S1923).

In a case where the skew correction method S_type is set to the mechanical skew correction (Y in Step S1913), the CPU 321 keeps verifying whether or not the image reading request has been transmitted from the controller 400 until the original reaches the reading position (Step S1925). When receiving the image reading request from the controller 400 (Y in Step S1925), the CPU 321 allows the read original image to be transmitted to the controller 400 (Step S1926).

When the original reaches the reading position (Y in Step S1924), the CPU 321 starts the reading processing for the original image using the CCD sensor unit 210 at a timing of the reaching (Y in Step S1924 and Step S1927). In the first embodiment, the image reading is conducted when the original reaches the position 10 mm before the reading position, but in the third embodiment, delays a position to start the image reading when the skew correction method S_type is set to the mechanical skew correction. This is because the tilt correction using the image processing is skipped for all the read images, and hence there is no need to store the image signal for the correction in the image memory 329.

The CPU 321 sets the skew correction method S_type for the succeeding original to the mechanical skew correction without detecting the skew amount from the read original image (Step S1928). The original image read when the skew correction method S_type is set to the mechanical skew correction does not require the detection of the skew amount or the skew correction before the image signal is transmitted to the controller 400. Therefore, the CPU 321 finishes reading the original when the original image corresponding to the detected length of the original has been read by the read sensor 14.

The above-mentioned processing relates to processing for conducting the skew correction for the original by only the mechanical skew correction. In this case, it is possible to effectively use the storage area of the image memory 329 by reducing the reading of the original image to the necessary minimum. The image reading apparatus 200 of the first and second embodiments always conducts the tilt correction using the image processing even on an original having a nonlinear leading edge, for example, a slip torn off from a booklet. Meanwhile, in the third embodiment, the skew correction can be conducted without use of the read original image, which achieves appropriate skew correction. It should be understood that, as described in the second embodiment, when the skew amount of the original is large to some extent in a row, the skew correction may be switched to only the mechanical skew correction. That is, the image reading apparatus 200 according to the third embodiment operates in the same manner as the image reading apparatus 200 according to the first and second embodiments, and when the mechanical skew correction is instructed, conducts only the mechanical skew correction irrespective of the skew amount.

Fourth Embodiment

The image reading apparatus 200 having the same configuration as that of the first embodiment may be used to read the original image by the following processing. In a fourth embodiment of the present invention, the skew correction method S_type has two kinds of correction, namely, the mechanical skew correction and the tilt correction using the image processing, and a combination of the mechanical skew correction and the tilt correction using the image processing is not used as the skew correction method S_type. Further, the control of a conveyance speed of the original is different from that of the first to third embodiments described above.

In the fourth embodiment, when the skew correction method S_type is set to the tilt correction using the image processing, the original is conveyed with a constant speed being maintained after the leading edge reaches the registration roller pair 3. In a case where the skew correction method S_type is set to the mechanical skew correction, the original temporarily stops being conveyed at the registration roller pair 3 to be subjected to the mechanical skew correction. After the mechanical skew correction, the registration roller pair 3 is rotated to convey the original faster than a conveyance speed at a time of usual image reading until the leading edge of the original reaches the upstream lead roller pair 5. The conveyance speed is returned to the conveyance speed at the time of the usual image reading by the time when the leading edge of the original reaches the upstream lead roller pair 5. It is determined based on a distance from a preceding original which position between the registration roller pair 3 and the upstream lead roller pair 5 the conveyance speed of the original is to be returned at.

Figure 18:
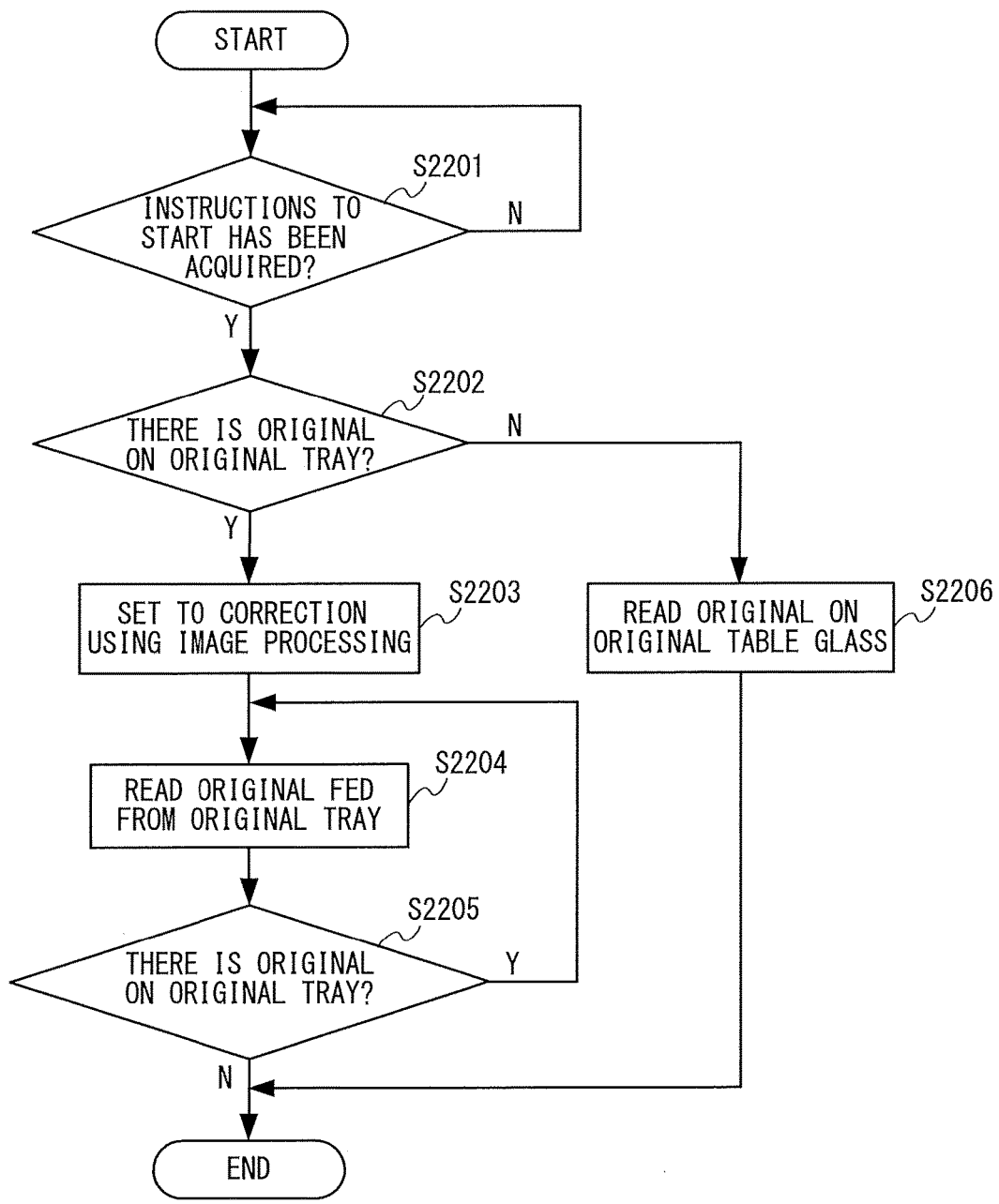
FIG. 18 is a flowchart for illustrating the image reading processing.
Figure 19:
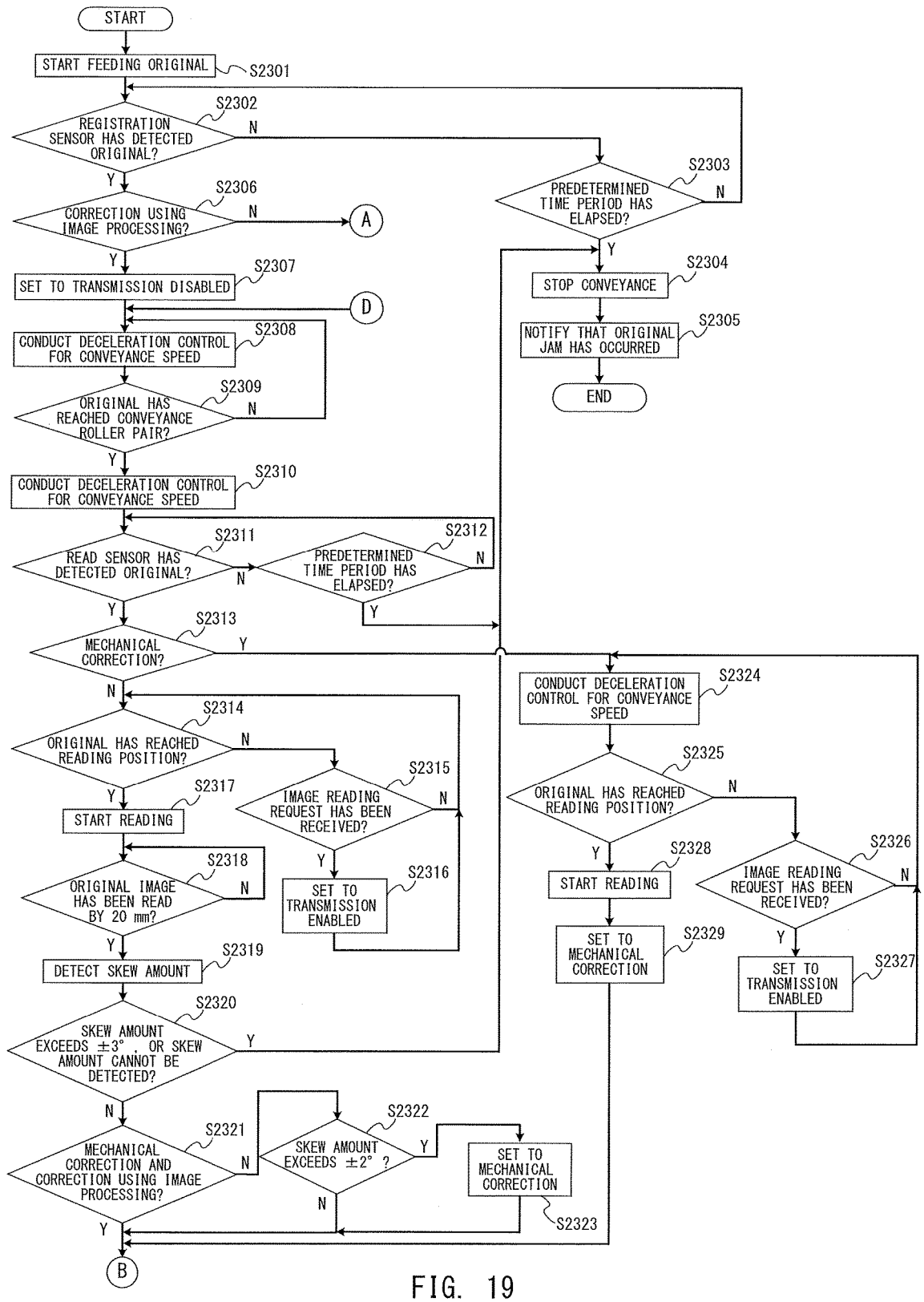
FIG. 19 is a flowchart for illustrating the reading processing for the original for each sheet.
Figure 20:
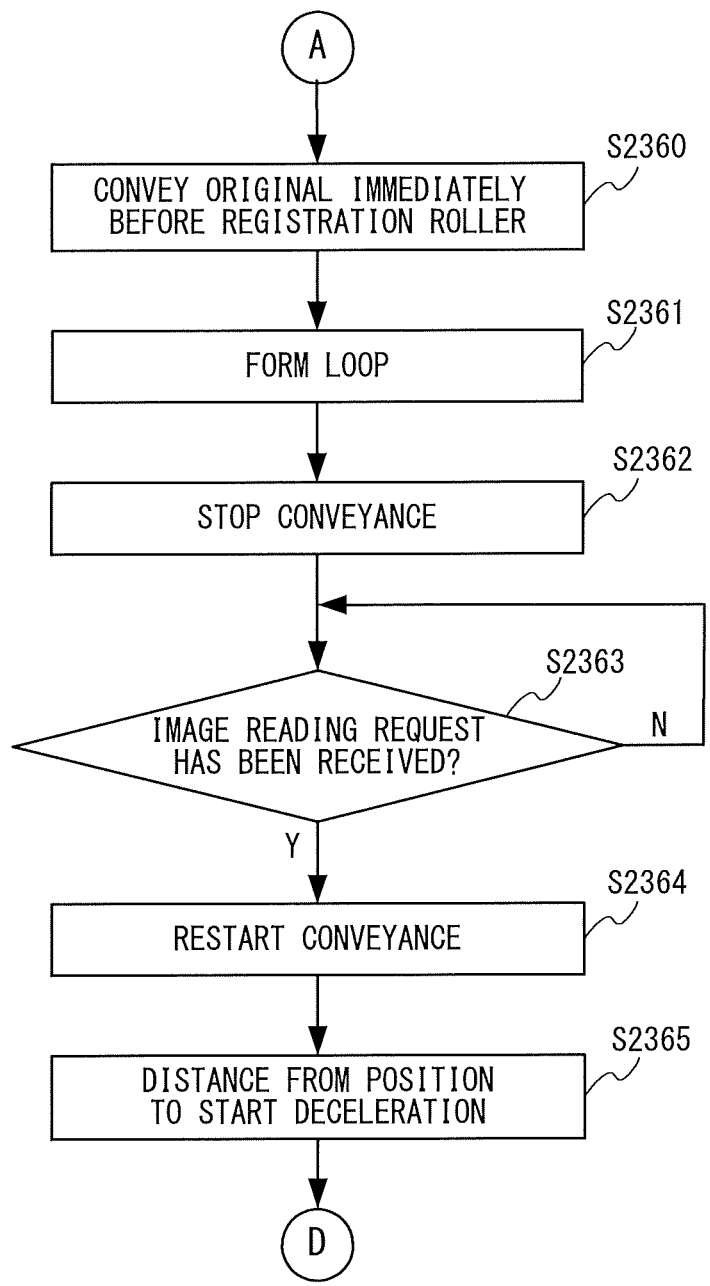
FIG. 20 is a flowchart for illustrating the reading processing for the original for each sheet.

FIG. 18 to FIG. 20 are flowcharts for illustrating the image reading processing according to the fourth embodiment. In the first to third embodiments, the originals are read one by one, and after the transmission of the image signal to the controller 400 is finished, the succeeding original starts being fed based on the detection result obtained by the original sensor 11. In the fourth embodiment, the succeeding original starts being fed before the reading processing for the preceding original is finished.

FIG. 18 is a flowchart for illustrating overall processing conducted when the original image is read from the original.

The CPU 321 acquires the instruction to start the reading processing for the original image from the operation unit 405 (Y in Step S2201), to thereby start the image reading processing. The CPU 321 determines whether or not the original is placed on the original tray 30 based on the detection result obtained by the original sensor 11 (Step S2202). When the original is not placed on the original tray 30 (N in Step S2202), the CPU 321 determines that the original is placed on the original table glass 202, and reads the original image from the original on the original table glass 202 (Step S2206). The CPU 321, which has read the original image from the original on the original table glass 202, brings the reading processing for the original image to an end.

When the original is placed on the original tray 30 (Y in Step S2202), the CPU 321 sets the skew correction method S_type to the tilt correction using the image processing (Step S2203). The CPU 321, which has set the skew correction method S_type, controls the driving of the respective rollers on the conveyance path to feed one of the originals from the original tray 30 and convey the original to the reading position, and reads the original image (Step S2204). In the fourth embodiment, the reading processing for a plurality of originals is simultaneously controlled, and hence the CPU 321 conducts multitask processing for switching an original to be processed to another original when a wait occurs in the processing for each original. In the fourth embodiment, the number of originals that can be processed in parallel is four. When the original is delivered to the delivery tray 31 and the transmission of the image signal of the original to the controller 400 is completed, the CPU 321 removes the original from the originals to be processed. The CPU 321 determines whether there is at least one original on the original tray 30 based on the detection result obtained by the original sensor 11 (Step S2205). When there is no original on the original tray 30 (N in Step S2205), the CPU 321 brings a series of reading processing for the original image to an end.

Figure 21:
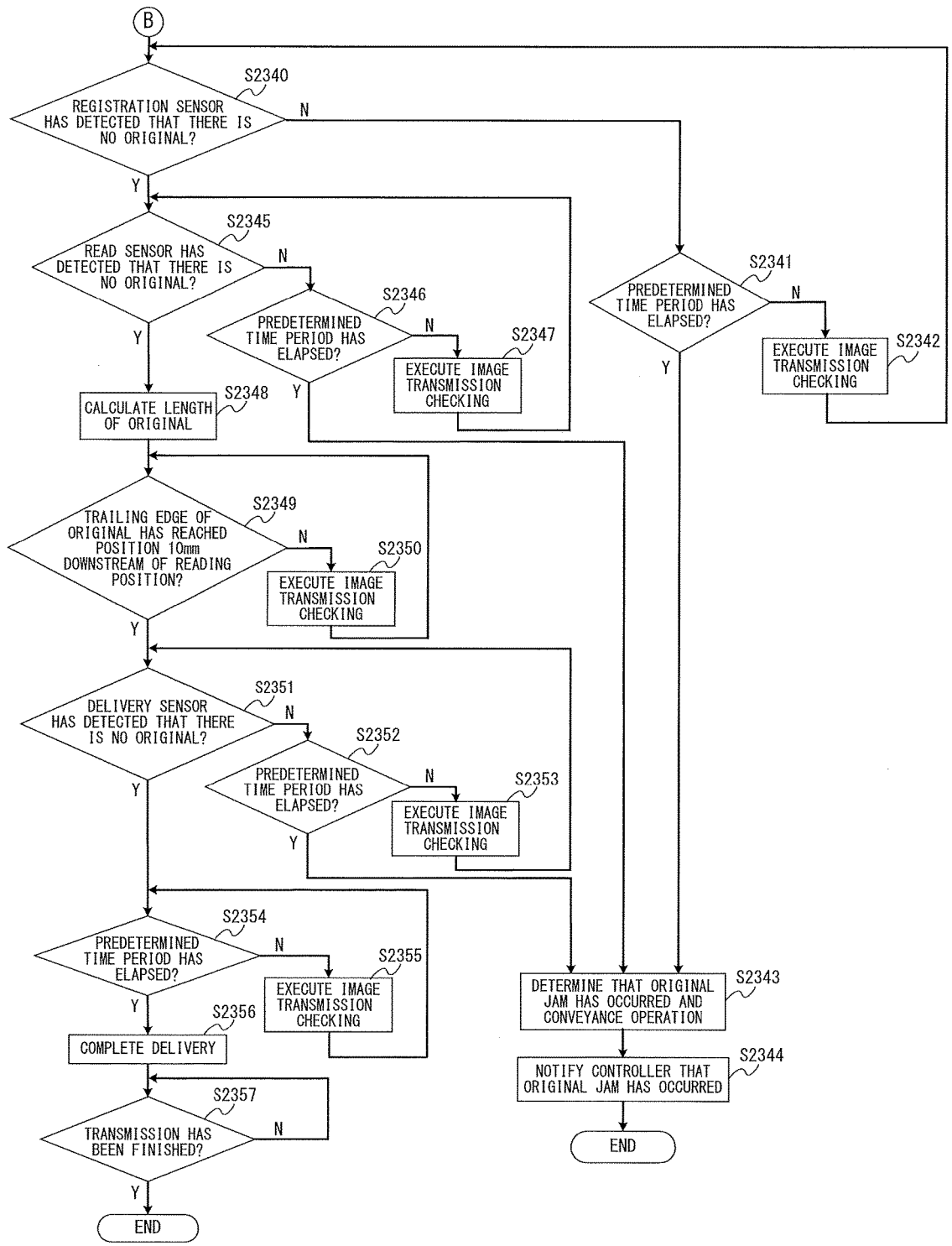
FIG. 21 is a flowchart for illustrating the reading processing for the original for each sheet.

FIG. 19, FIG. 20, and FIG. 21 are flowcharts for illustrating the reading processing for the original for each sheet based on the processing of Step S2204. The CPU 321 executes the processing after setting the skew correction method S_type to the tilt correction using the image processing.

The processing (Step S2301 to Step S2306) from the feeding of the original to the determination of the skew correction method S_type is the same processing as the processing of from Step S1903 to Step S1908 of the third embodiment illustrated in FIG. 17. In a case where the skew correction method S_type is set to the mechanical skew correction (N in Step S2306), as illustrated in FIG. 20, the CPU 321 conducts the processing of from Step S2360 to Step S2364 that is the same as the processing of from Step S1150 to Step S1154 of FIG. 13 of the first embodiment.

In the fourth embodiment, when the conveyance of the original is restarted in the processing of Step S2364, the original is conveyed at a speed faster than the conveyance speed at a time of the reading processing. Therefore, the image cannot be read while the conveyance speed is maintained. The CPU 321 determines a distance to a position to start deceleration in order to reduce the conveyance speed of the original to a speed that allows the reading (Step S2365).

Figure 22:
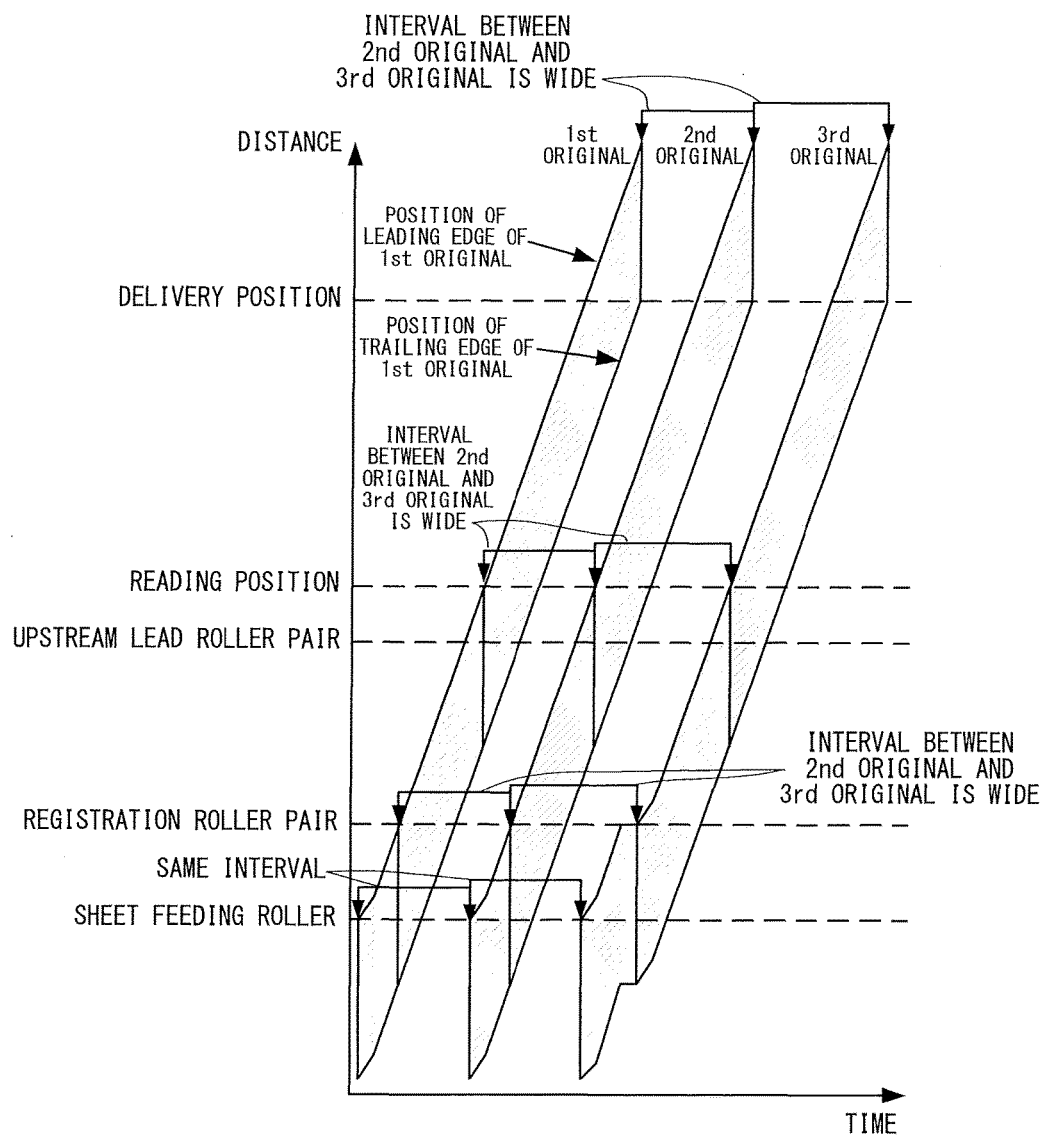
FIG. 22 is a diagram for illustrating a relationship between a distance in a conveyance direction of the original and time.

The mechanical skew correction is conducted by bringing the leading edge of the original into abutment with the registration roller pair 3 in a stopped state to bend the original and again rotating the registration roller pair 3. Therefore, in the mechanical skew correction, when the conveyance speed of the original is set equal to the conveyance speed at the time of the image reading, a reading interval between originals tends to become wider than in the tilt correction using the image processing, which does not need to stop the conveyance of the original by the registration roller pair 3. FIG. 22 is an illustration of a relationship between a distance in the conveyance direction of the original and time. In FIG. 22, the diagonally shaded parts each indicate the area of the original. The skew correction method S_type is set to the tilt correction using the image processing for the first sheet and the second sheet, and set to the mechanical skew correction for the third sheet.

When the first sheet is fed, the leading edge of the first original is located at the position of the sheet feeding roller 1, and the trailing edge is located behind the position of the sheet feeding roller 1. As illustrated in FIG. 22, when the leading edge of the original reaches the registration roller pair 3, the trailing edge is located on the original tray 30 without having reached the position of the sheet feeding roller 1. In FIG. 22, a change in conveyance speed of the original is understood from the relationship between the distance between the leading edge or the trailing edge of the original and the time. The first original has a low conveyance speed when the leading edge starts moving from the sheet feeding roller 1, and after acceleration is completed, the conveyance speed exhibited subsequently becomes constant. This is because the skew correction method S_type is set to the tilt correction using the image processing, and hence there is no need to stop the conveyance of the original at the registration roller pair 3. The second original exhibits the same behavior as that of the first original. The second original reaches the reading position while maintaining an interval with respect to the first original at a time of the start of the feeding, and the same interval is maintained when the trailing edge of the original reaches a delivery position.

The skew correction method S_type is set to the mechanical skew correction for the third original. Therefore, when the leading edge reaches the registration roller pair 3, the third original temporarily stops being conveyed to be subjected to the skew correction. After being stopped at the registration roller pair 3, the third original restarts being conveyed, and the conveyance speed becomes the same as a reading speed after the acceleration is completed. Therefore, an interval between the third original and the second original is the same as an interval between the first sheet and the second sheet at the time of the feeding, but becomes wider when the third original passes through the registration roller pair 3. The third original is delivered at the conveyance speed without being accelerated or decelerated, and hence the interval with respect to the second sheet remains wider when the delivery is completed.

Figure 23:
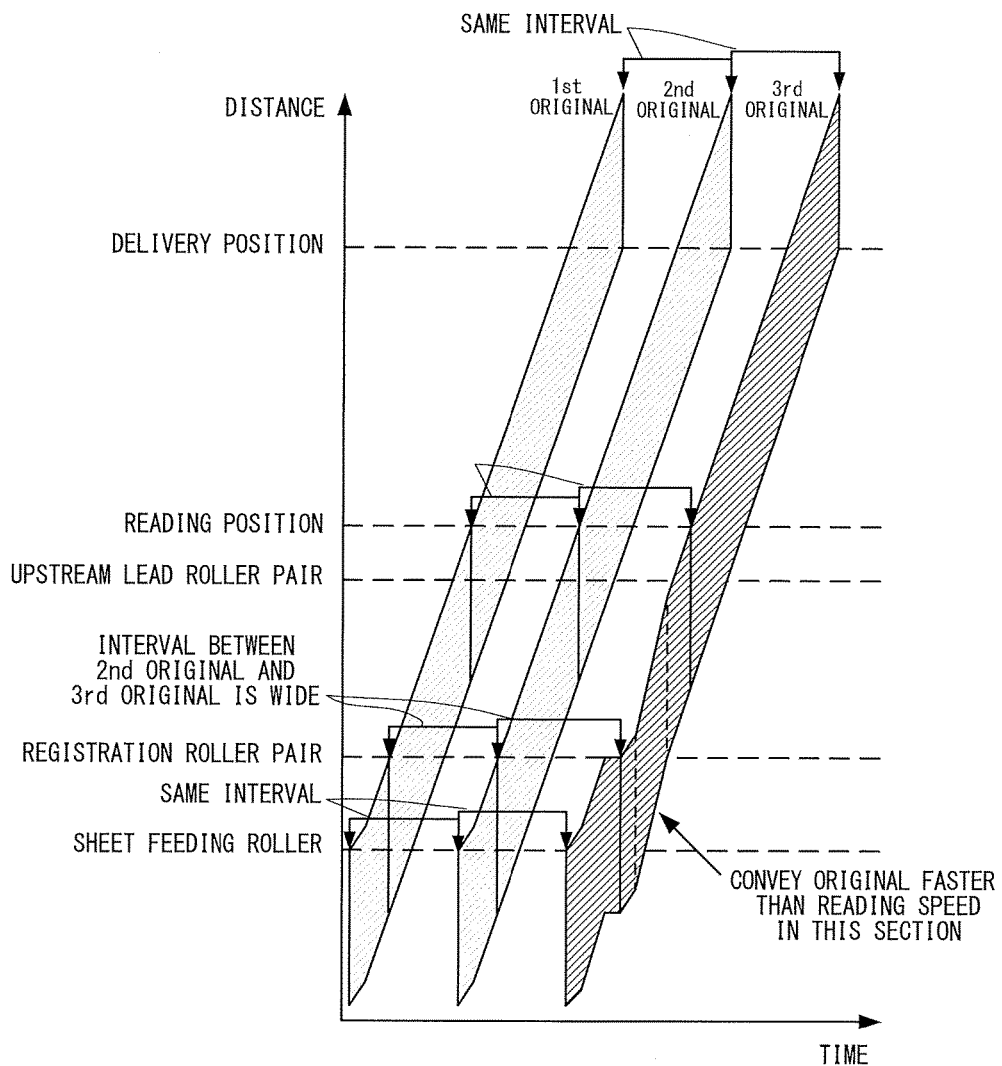
FIG. 23 is a diagram for illustrating a relationship between the distance in the conveyance direction of the original and the time.

In view of the foregoing, the conveyance speed exhibited when the conveyance of the original is restarted after the mechanical skew correction is set higher than the conveyance speed at the time of the reading. FIG. 23 is an illustration of a relationship between the distance in the conveyance direction of the original and the time exhibited in this case. In FIG. 23, the diagonal lines indicating the conveying positions of the originals each indicate the relationship between the distance and the position, and as the conveyance speed becomes higher, the tilt becomes larger. Hence, it is possible to reduce the interval between the third original and the preceding second original by conveying the third original faster than the second original while the third original is located within a range of a quadrilateral surrounded by the dotted line during the conveyance. The original image is read when the leading edge of the original reaches the reading position, and hence it is possible to set the reading interval between originals closer to a reading interval exhibited when the skew correction method S_type is set to the tilt correction using the image processing. The original subjected to the mechanical skew correction is conveyed to the reading position at the same timing as that of the original at the time of the tilt correction using the image processing.

Therefore, the CPU 321 acquires a distance from the preceding original when the conveyance of the original is restarted. The position of the preceding original is determined based on the timing when the original trailing edge is detected by the registration sensor 13 or the read sensor 14 and the count value of the clock of the motor configured to rotate the conveyance roller pair 4 or the upstream lead roller pair 5. The CPU 321 determines the distance that allows the conveyance at the conveyance speed exhibited when the conveyance of the original is restarted based on a relationship among a speed difference between the conveyance speed exhibited when the conveyance of the original is restarted and the conveyance speed of the preceding original, the distance from the preceding original, and a change in distance exhibited when the conveyance speed is changed. However, a common motor is used to drive the respective rollers of from the upstream lead roller pair 5 to the delivery roller pair 8, and hence the third original can follow the second original at a conveyance speed faster than that of the second original only until the leading edge of the original reaches the upstream lead roller pair 5. When the registration roller pair 3 has been stopped for a short time period with a short distance from the preceding original, it suffices that the conveyance speed of the original is reduced to the reading speed of the original before the original reaches the upstream lead roller pair 5. This indicates that an upper limit of the distance that allows the conveyance at the conveyance speed exhibited when the conveyance of the original is restarted is the distance from the registration roller pair 3 to the upstream lead roller pair 5. Depending on the position of the preceding original, when the upstream lead roller pair 5 is rotated faster while the preceding original is being read, the reading speed of the preceding original also increases. Therefore, the upstream lead roller pair 5 needs to be kept at the reading speed of the original.

In a case where it is determined in the processing of Step S2306 of FIG. 19 that the tilt correction using the image processing is set to the skew correction method S_type (Y in Step S2306), the CPU 321 sets the image transmission state Tsts to image transmission disabled (Step S2307). After the processing of FIG. 20 or after setting the image transmission state Tsts, the CPU 321 conducts deceleration control for the conveyance speed of the original (Step S2308).

Figure 24:
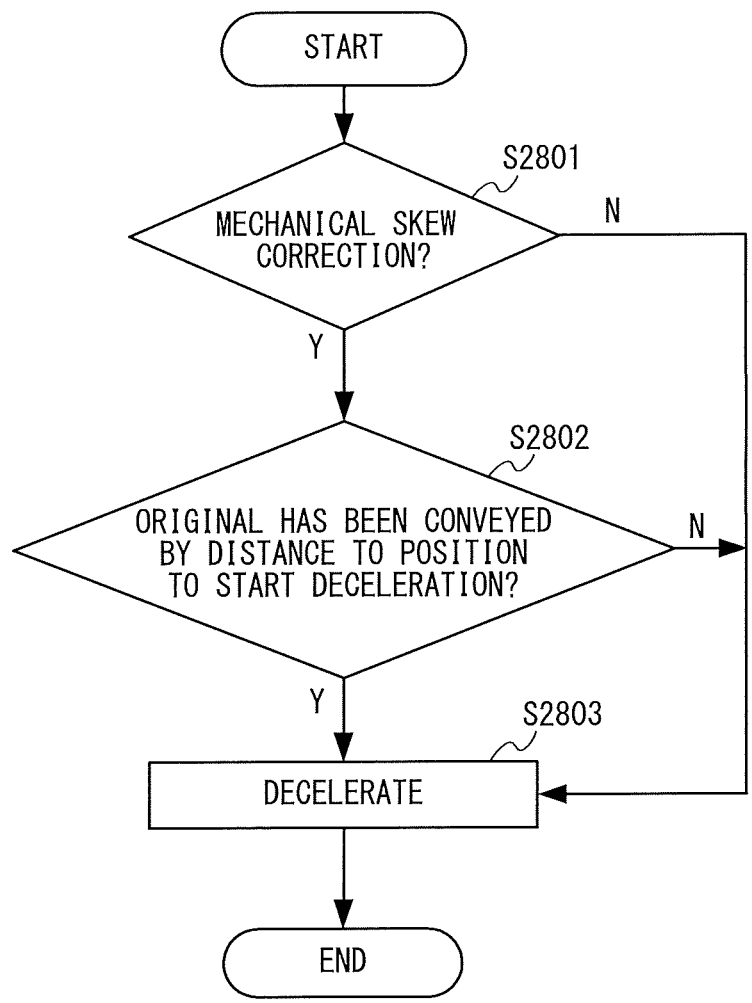
FIG. 24 is a flowchart for illustrating deceleration control for a conveyance speed.

FIG. 24 is a flowchart for illustrating the deceleration control for the conveyance speed. The deceleration control becomes effective when the skew correction method S_type is set to the mechanical skew correction (Y in Step S2801). In a case where the skew correction method S_type is set to the mechanical skew correction, the CPU 321 conveys the original by the conveyance amount determined in Step S2365 illustrated in FIG. 20, and starts reducing the conveyance speed (Y in Step S2802 and Step S2803). In a case where the skew correction method S_type is set to the tilt correction using the image processing (N in Step S2801), the conveyance speed of the original remains constant after the leading edge of the original passes through the registration roller pair 3 until the image reading is finished. Therefore, the CPU 321 does not need to conduct the deceleration control.

The conveyance speed of the original is reduced when the original has been conveyed by the conveyance amount determined in the processing of Step S2365, and hence, when the determined conveyance amount is longer than the distance between the registration roller pair 3 and the conveyance roller pair 4, the leading edge of the original reaches the conveyance roller pair 4 without being decelerated (Y in Step S2309). A start position to start reducing the conveyance speed of the original is any position between the registration roller pair 3 and the upstream lead roller pair 5 based on the conveyance amount determined in the processing of Step S2365. In the flowchart of FIG. 19, processing for reducing the conveyance speed of the original is conducted in any one of Step S2308, Step S2310, and Step S2324.

When the leading edge of the original reaches the detection position of the read sensor 14 (Y in Step S2311) with the skew correction method S_type being set to the tilt correction using the image processing (N in Step S2313), there is no need to conduct the deceleration control for the conveyance speed of the original. In this case, the conveyance speed of the original is the same as the reading speed, and hence the deceleration control for the conveyance speed of the original is not conducted in the same manner as in the processing of Step S2324 conducted when the skew correction method S_type is set to the mechanical skew correction (Y in Step S2313).

After the processing for reducing the conveyance speed, when the skew correction method S_type is set to the tilt correction using the image processing (N in Step S2313 and Step S2314 to Step S2323), the CPU 321 conducts the same processing as the processing of from Step S1913 to Step S1923 of the third embodiment. In a case where the skew correction method S_type is set to the mechanical skew correction (Y in Step S2313 to Step S2329), the CPU 321 conducts the deceleration control for the conveyance speed of the original by the processing of Step S2324. The processing of other steps is the same as the processing of from Step S1924 to Step S1928 of the third embodiment illustrated in FIG. 17. The processing of the subsequent steps (Step S2340 to Y in Step S2357) is the same as the previous processing of from Step S1130 to Step S1147 although the processing corresponding to Step S1148 becomes unnecessary due to a difference in that the processing of the subsequent steps involves a sequence for conveying one sheet of the original.

With this configuration, even when the conveyance of the original is temporarily stopped and restarted after the skew correction method for the original is switched to the mechanical skew correction, the image reading apparatus 200 can set the number of originals per unit time equal to the number of originals per unit time set for the tilt correction using the image processing.

The image reading apparatus 200 according to the fourth embodiment sets the original conveyance speed faster than the original reading speed at the time of restarting the conveyance from the registration roller pair 3 (Step S2364) when the skew correction method S_type is set to the mechanical skew correction. Therefore, the distance for causing the conveyance speed of the original to become faster than the reading speed is determined in order to maintain the number of originals to be read per unit time even after the skew correction method S_type is switched from the tilt correction using the image processing to the mechanical skew correction. The image reading apparatus 200 may also set the conveyance speed of the original at the time of restarting the conveyance from the registration roller pair 3 equal to the reading speed, to thereby be able to eliminate the need to change the conveyance speed of the original after that and reduce an occurrence of noise involved in the change of the conveyance speed. The conveyance speed of the original is faster than the reading speed, and hence the image reading apparatus 200 may also increase the distance required for reducing the conveyance speed to the reading speed, to thereby be able to increase the number of originals to be read per unit time although noise is produced due to the speed change.

In this manner, when it is determined that the skew amount of the original is sufficiently large, although not large enough to stop the conveyance of the original, the image reading apparatus 200 conducts the mechanical skew correction for the original before the image reading in advance in the reading processing for the subsequent originals. This allows the image reading apparatus 200 to inhibit the conveyance of the original from being stopped even when the skew amount is large.

Even in a case of including a tilt correction function using the image processing, by executing the mechanical skew correction when the skew amount becomes larger, the image reading apparatus 200 according to the respective embodiments described above can inhibit the conveyance of the original from being stopped due to the skew amount exceeding the limit. The image reading apparatus 200 can appropriately conduct correction control for the tilt of the image based on the skew amount to efficiently correct a defect of the original image due to the skew of the original. Therefore, usability is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-158738, filed Aug. 12, 2016 which is hereby incorporated by reference herein in its entirety.

What is claimed is:

1. An image reading apparatus, comprising:
   an original tray on which an original is to be placed;
   a reader configured to read an image of the original;
   a conveyor configured to convey the original from the original tray to a reading position used by the reader;
   a skew corrector provided on a path for conveying the original and configured to mechanically correct skew of the original;
   an image processor configured to conduct image processing on an original image read by the reader, to thereby correct a tilt of the original image;
   a controller configured to:
      acquire a skew amount of the original at a time of conveyance of the original based on the original image read by the reader;
      stop the conveyance of the original using the conveyor in a case where an absolute value of the skew amount based on the original image read by the reader without conducting correction of the skew using the skew corrector is larger than a predetermined first threshold value;
      control the skew corrector to correct skew of a succeeding original and control the image processor to correct the tilt of the original image in a case where the absolute value of the skew amount is smaller than the predetermined first threshold value and larger than a second threshold value that is smaller than the predetermined first threshold value; and
      control the image processor to correct the tilt of the original image in a case where the absolute value of the skew amount is smaller than the second threshold value.

2. The image reading apparatus according to claim 1, wherein the image processor is configured to correct the tilt of the original image based on the skew amount acquired by the controller.

3. The image reading apparatus according to claim 2, further comprising an image memory configured to store the original image read by the reader,
   wherein the image processor is configured to read and rearrange the original image stored in the image memory pixel by pixel in an order corresponding to the skew amount, to thereby correct the tilt.

4. The image reading apparatus according to claim 1, wherein the controller is configured to extract a boundary between an original part included in the original image and a background part being an image of a conveyance path for the original, and to determine the skew amount based on the boundary.

5. The image reading apparatus according to claim 4, wherein the controller is configured to determine the skew amount based on a shadow image corresponding to a shadow that occurs on the boundary between the original part and the background part.

6. The image reading apparatus according to claim 1, wherein the controller is configured to control the skew corrector to correct the skew of the succeeding original and control the image processor to correct the tilt of the original image in a case where the absolute value of the skew amount based on the original image read by the reader without conducting the correction of the skew using the skew corrector is smaller than the second threshold value and larger than a third threshold value that is smaller than the second threshold value.

7. The image reading apparatus according to claim 6, wherein the controller is configured to control the skew corrector to correct the skew of the succeeding original and control the image processor to correct the tilt of the original image in a case where the absolute value of the skew amount based on the original image read by the reader without conducting the correction of the skew using the skew corrector is smaller than the second threshold value and larger than the third threshold value a predetermined number of times in a row.

8. The image reading apparatus according to claim 1, wherein the controller is configured to control the skew corrector to correct the skew of the original irrespective of the skew amount in a case where the skew corrector is instructed to correct the skew.

9. The image reading apparatus according to claim 1, wherein:
   the skew corrector is configured to temporarily stop the conveyance of a leading side of the original to correct the skew of the original; and
   the controller is configured to control the conveyor to convey the original corrected by the skew corrector to the reading position by controlling a conveyance speed so that the original is conveyed to the reading position at the same timing as a timing exhibited when the correction using the skew corrector is not performed.

10. The image reading apparatus according to claim 9, wherein the controller is configured to control the conveyor to convey the original by a predetermined distance at a conveyance speed faster than a conveyance speed exhibited when the correction using the skew corrector is not performed.

11. An image reading method to be executed by an image reading apparatus,
   the image reading apparatus comprising:
      an original tray on which an original is to be placed;
      a reader configured to read an image of the original;
      a conveyor configured to convey the original from the original tray to a reading position used by the reader; and
      a skew corrector provided on a path for conveying the original and configured to mechanically correct skew of the original at a time of conveyance of the original,
   the image reading method comprising:
      acquiring a skew amount of the original at the time of the conveyance of the original based on an original image read by the reader;
      stopping the conveyance of the original using the conveyor in a case where an absolute value of the skew amount based on the original image read by the reader without conducting correction of the skew using the skew corrector is larger than a predetermined first threshold value;
      causing the skew corrector to correct skew of a succeeding original and correcting a tilt of the original image by conducting image processing on the original image read by the reader in a case where the absolute value of the skew amount based on the original image read by the reader without conducting the correction of the skew using the skew corrector is smaller than the predetermined first threshold value and larger than a second threshold value that is smaller than the predetermined first threshold value; and correcting the tilt of the original image by conducting the image processing on the original image read by the reader in a case where the absolute value of the skew amount based on the original image read by the reader without conducting the correction of the skew using the skew corrector is smaller than the second threshold value.

12. The image reading method according to claim 11, further comprising correcting, by the image reading apparatus, the tilt of the original image by conducting the image processing based on the skew amount.

13. The image reading method according to claim 12, wherein:
the image reading apparatus further comprises an image memory configured to store the original image read by the reader; and
the image reading method further comprises reading and rearranging the original image stored in the image memory pixel by pixel in an order corresponding to the skew amount, to thereby correct the tilt.

14. The image reading method according to claim 11, further comprising extracting, a boundary between an original part included in the original image and a background part being an image of a conveyance path for the original, and determining the skew amount based on the boundary.

15. The image reading method according to claim 14, further comprising determining, the skew amount based on a shadow image corresponding to a shadow that occurs on the boundary between the original part and the background part.

16. The image reading method according to claim 11, further comprising causing, by the image reading apparatus, the skew corrector to correct the skew of the succeeding original and correcting the tilt of the original image by conducting the image processing in a case where the absolute value of the skew amount based on the original image read by the reader without conducting the correction of the skew using the skew corrector is smaller than the second threshold value and larger than a third threshold value that is smaller than the second threshold value.

17. The image reading method according to claim 16, further comprising causing, by the image reading apparatus, the skew corrector to correct the skew of the succeeding original and correcting the tilt of the original image by conducting the image processing when the absolute value of the skew amount based on the original image read by the reader without conducting the correction of the skew using the skew corrector is smaller than the second threshold value and larger than the third threshold value a predetermined number of times in a row.

18. The image reading method according to claim 11, further comprising causing, by the image reading apparatus, the skew corrector to correct the skew of the original irrespective of the skew amount when the skew corrector is instructed to correct the skew.

19. The image reading method according to claim 11, further comprising:
temporarily stopping, by the skew corrector, the conveyance of a leading side of the original to correct the skew of the original; and
causing, by the image reading apparatus, the conveyor to convey the original corrected by the skew corrector to the reading position by controlling a conveyance speed so that the original is conveyed to the reading position at the same timing as a timing exhibited when the correction using the skew corrector is not performed.

20. The image reading method according to claim 19, further comprising causing, by the image reading apparatus, the conveyor to convey the original by a predetermined distance at a conveyance speed faster than a conveyance speed exhibited when the correction using the skew corrector is not performed.

* * * * *